United States Patent [19]

Leitch et al.

[11] Patent Number: 5,689,440

[45] Date of Patent: Nov. 18, 1997

[54] VOICE COMPRESSION METHOD AND APPARATUS IN A COMMUNICATION SYSTEM

[75] Inventors: Clifford Dana Leitch, Coral Springs; Robert John Schwendeman, Pompano Beach; Kazimierz Siwiak; William Joseph Kuznicki, both of Coral Springs; Sunil Satyamurti, Delray Beach, all of Fla.

[73] Assignee: Motorola, Inc., Schaumburg, Ill.

[21] Appl. No.: 764,656

[22] Filed: Dec. 11, 1996

Related U.S. Application Data

[63] Continuation of Ser. No. 395,747, Feb. 28, 1995, abandoned.

[51] Int. Cl.$^6$ ............................................. H04B 7/00
[52] U.S. Cl. ................. 364/514 R; 370/109; 455/54.1; 455/70; 381/29; 381/34
[58] Field of Search ........................ 381/29, 30, 35, 381/36, 37, 34; 364/514 R; 395/2.14, 2.12, 2.21, 2.24, 2.29; 340/825.44; 455/54.1, 70, 72, 109, 47, 38.1

[56] References Cited

U.S. PATENT DOCUMENTS

| | | | |
|---|---|---|---|
| 3,793,589 | 2/1974 | Puckette | 325/137 |
| 4,134,069 | 1/1979 | Shiki . | |
| 4,586,174 | 4/1986 | Wong | 370/69.1 |
| 4,839,923 | 6/1989 | Kotzin | 381/31 |
| 4,875,038 | 10/1989 | Siwiak et al. | 340/825.44 |
| 4,882,579 | 11/1989 | Siwiak | 340/825.44 |
| 4,955,083 | 9/1990 | Phillips et al. . | |
| 5,068,898 | 11/1991 | Dejmek et al. | 381/29 |
| 5,121,391 | 6/1992 | Paneth et al. . | |
| 5,175,769 | 12/1992 | Hejna, Jr. et al. | 340/825.44 |
| 5,216,744 | 6/1993 | Alleyne et al. | 381/29 |
| 5,239,306 | 8/1993 | Siwiak et al. | 340/825.44 |
| 5,282,205 | 1/1994 | Kuznicki | 370/94.1 |
| 5,387,981 | 2/1995 | Orlen et al. | 358/400 |
| 5,533,062 | 7/1996 | Liberti, Jr. et al. | 375/334 |
| 5,535,215 | 7/1996 | Hieatt, III | 370/95.1 |

OTHER PUBLICATIONS

Verhelst and Roelands, *An Overlap–Add Technique Based On Waveform Similarity (WSOLA) For High Qality Time–Scale Modification Of Speech*, IEEE 1993, pp. II–554–II–557.

Oppenheim and Schafer, *Changing the Sampling Rate Using Discrete–Time Processing*, Discrete–Time Signal Processing, 1989, Ch. 3.6, pp. 101–112.

Primary Examiner—Ellis B. Ramirez
Assistant Examiner—Demetra R. Smith
Attorney, Agent, or Firm—James A. Lamb

[57] ABSTRACT

The present invention comprises a method for compressing a plurality of voice signals within a voice communication resource (see FIG. 6) having a given bandwidth within a voice communication system (100). The method comprises the steps of subchanneling the voice communication resource into a plurality of subchannels (441, 442, 443), placing a pair of the plurality of voice signals (401, 402) on a subchannel (441); modulating the pair of the plurality of voice signals (401, 402) about a pilot signal (581) within the subchannel (441) using single sideband modulation; and compressing the time of each of the voice signals (401, 402) within the plurality of subchannels (441, 442, 443), wherein these step provide a compressed voice signal.

20 Claims, 14 Drawing Sheets

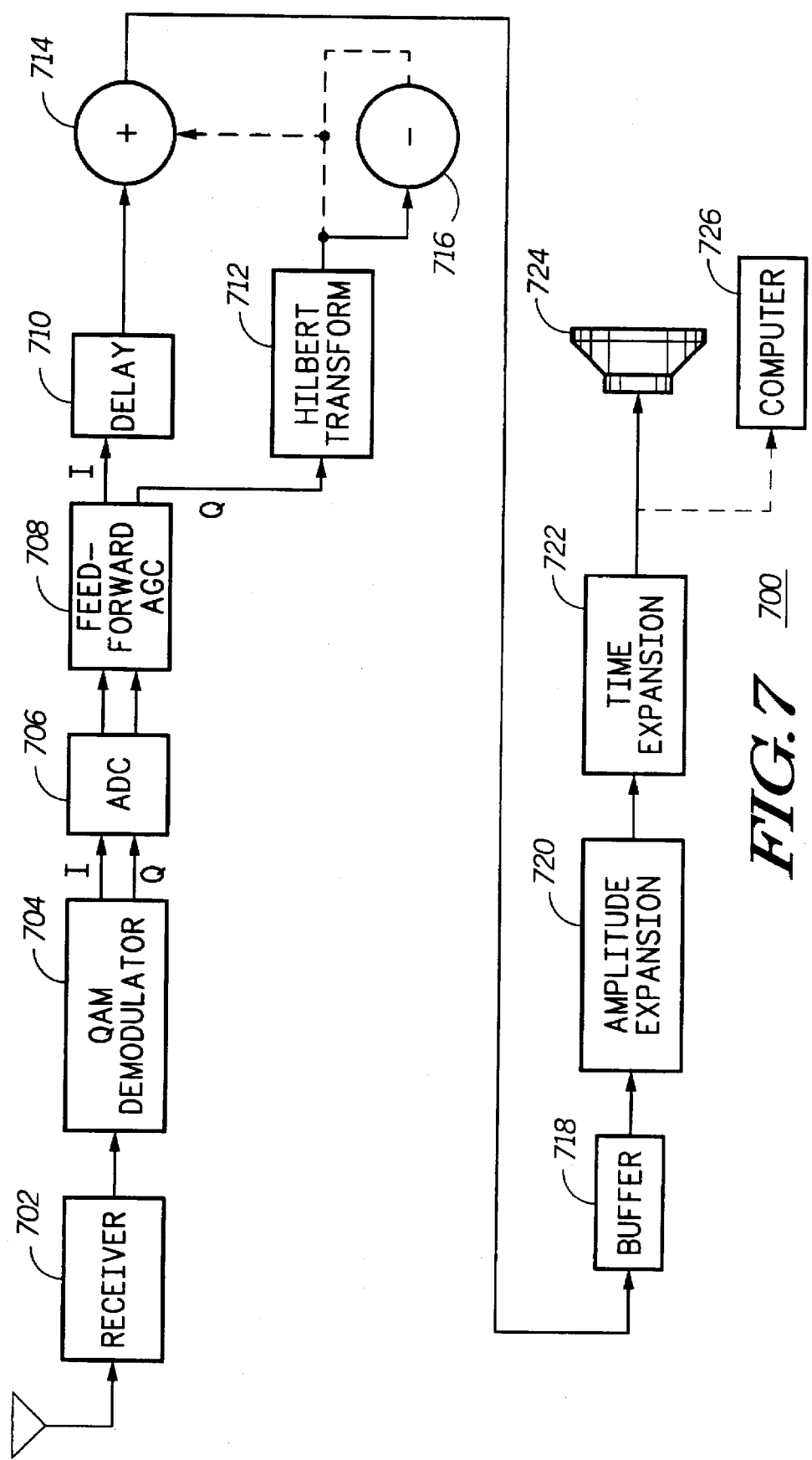

VOICE COMPRESSION METHOD AND APPARATUS IN A COMMUNICATION SYSTEM

This is a continuation of application Ser. No. 08/395,747 filed Feb. 28, 1995, now abandoned.

TECHNICAL FIELD

This invention relates generally to voice compression techniques, and more particularly a method and apparatus of voice compression using efficient bandwidth utilization and time compression techniques.

BACKGROUND

Voice message paging is not economically feasible for large paging systems with current technology. The air time required for a voice page is much more than that required for a tone, numeric or alphanumeric page. With current technology, voice paging service would be economically prohibitive in comparison to tone, numeric or alphanumeric paging with less than ideal voice quality reproduction. Another constraint in limiting voice message paging is the bandwidth and the present methods of utilizing the bandwidth of paging channels. In comparison, the growth of alphanumeric paging has been constrained by the limited access to a keyboard input device for sending alphanumeric messages to a paging terminal, either in the form of a personal keyboard or a call to an operator center. A voice system overcomes these entry issues since a caller can simply pick up a telephone, dial access numbers, and speak a message. Further, none of the present voice paging systems take advantage of Motorola's new high speed paging protocol structure, also known as FLEX™.

Existing voice paging systems lack many of the FLEX™ protocol advantages including high battery saving ratios, multiple channel scanning capability, mixing of modes such as voice with data, acknowledge-back paging (allowing for return receipts to the calling party), location finding capability, system and frequency reuse, particularly in large metropolitan areas, and range extension through selective re-transmission of missed message portions.

With respect to the aspect of paging involving time-scaling of voice signals and to other applications such as dictation and voice mail, current methods of time-scaling lack the ideal combinations of providing adequate speech quality and flexibility that allows a designer to optimize the application within the constraints given. Thus, there exists a need for a voice communication system that is economically feasible and flexible in allowing optimization within a given configuration, and more particularly with respect to paging applications, that further retains many of the advantages of Motorola's FLEX™ protocol.

SUMMARY OF THE INVENTION

In one aspect, the present invention comprises a method for compressing a plurality of voice signals within a voice communication resource having a given bandwidth within a voice communication system. The method comprises the steps of subchanneling the voice communication resource while placing at least one of each of the plurality of voice signals on a subchannel and compressing the time of each of the voice signals within each of the subchannels, wherein these steps provide a compressed voice signal.

In another aspect of the present invention, a communication system using voice compression has at least one transmitter base station and a plurality of selective call receivers. The transmitter base station comprises an input device for receiving an audio signal, a processing device for compressing the audio signal using a time-scale compression technique and a single side band modulation technique to provide a processed signal and a quadrature amplitude modulator for the subsequent transmission of the processed signal. Each of the plurality of selective call receivers comprises a selective call receiver module for receiving the transmitted processed signal, a processing device for demodulating the received processed signal using a single side band demodulation technique and a time-scale expansion technique to provide a reconstructed signal, and an amplifier for amplifying the reconstructed signal into an reconstructed audio signal.

In another aspect of the present invention, a selective call receiver for receiving compressed voice signals, comprises a selective call receiver module for receiving a transmitted processed signal, a processing device for demodulating the received processed signal using a single side band demodulation technique and a time-scale expansion technique to provide a reconstructed signal, and an amplifier for amplifying the reconstructed signal into an reconstructed audio signal.

In yet another aspect of the present invention, a paging base station for transmitting selective call signals on a communication resource having a predetermined bandwidth, comprises, an input device for receiving a plurality of audio signals, a device for subchannelizing the communication resource into a predetermined number of subchannels, an amplitude compression and filtering module for each subchannel for compressing the amplitude of the respective audio signal and filtering the respective audio signal, a time compression module for compression of the time of the respective audio signal for each subchannel, and a quadrature amplitude modulator for the subsequent transmission of the processed signal.

BRIEF DESCRIPTION OF THE DRAWINGS

FIG. 7 is an expanded electrical block diagram of a selective call receiver in accordance with the present invention.

DETAILED DESCRIPTION OF THE PREFERRED EMBODIMENT

Figure 1:
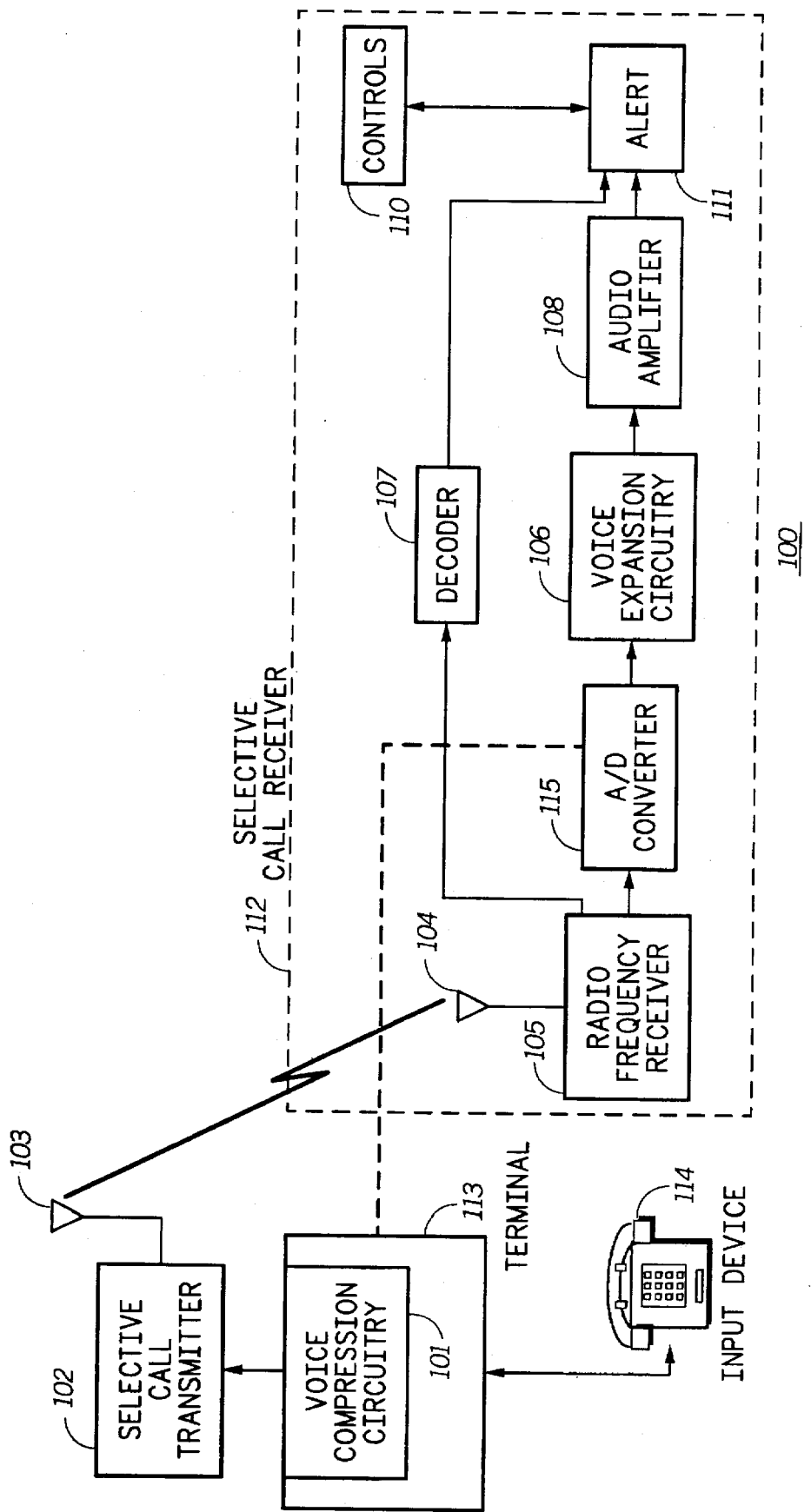
FIG. 1 is a block diagram of a voice communication system in accordance with the present invention.

Referring to FIG. 1, a communication system illustrative of the voice compression and expansion techniques of the present invention are shown in a block diagram of the selective call system 100 which comprises an input device for receiving an audio signal such as telephone 114 (or other input device such as a computer) from which voice based selective calls are initiated for transmission to selective call receivers in the system 100. Each selective call entered through the telephone 114 typically comprises (a) a receiver address of at least one of the selective call receivers in the system and (b) a voice message. The initiated selective calls are typically provided to a transmitter base station or a selective call terminal 113 for formatting and queuing. Voice compression circuitry 101 of the terminal 113 serves to compress the time length of the provided voice message (the detailed operation of such voice compression circuitry 101 is discussed in the following description of FIGS. 2, 3 and 4). Preferably, the voice compression circuitry 101 includes a processing device for compressing the audio signal using a time-scaling technique and a single sideband modulation technique to provide a processed signal. The selective call is then input to the selective call transmitter 102 where it is applied as modulation to a radio frequency signal which is sent over the air through an antenna 103. Preferably, the transmitter is a quadrature amplitude modulation transmitter for transmitting the processed signal.

An antenna 104 within a selective call receiver 112 receives the modulated, transmitted radio frequency signal and inputs it to a selective call receiver module or radio frequency receiver module 105 for receiving the processed signal or radio frequency signal, where the radio frequency signal is demodulated and the receiver address and the compressed voice message modulation are recovered. The compressed voice message is then provided to an analog to digital converter (A/D) 115. Preferably, the selective call receiver 112 includes a processing device for demodulating the received processed signal using a single sideband demodulation technique and a time-scaling expansion technique to provide a reconstructed signal. The compressed voice message is then provided to a voice expansion circuit 106 where the time length of the voice message is preferably expanded to the desired value (the detailed operation of such voice expansion circuitry 106 used in the present invention is discussed in the following description of FIGS. 7 and 8). The voice message is then provided to an amplifier such as audio amplifier 108 for the purpose of amplifying it to a reconstructed audio signal.

The demodulated receiver address is supplied from the radio frequency receiver 105 to a decoder 107. If the receiver address matches any of the receiver addresses stored in the decoder 107, an alert 111 is optionally activated, providing a brief sensory indication to the user of the selective call receiver 112 that a selective call has been received. The brief sensory indication may comprise an audible signal, a tactile signal such as a vibration, or a visual signal such as a light, or a combination thereof. The amplified voice message is then furnished from the audio amplifier 108 to an audio loudspeaker within the alert 111 for message announcement and review by the user.

The decoder 107 may comprise a memory in which the received voice messages can be stored and recalled repeatedly for review by actuation of one or more controls 110.

In another aspect of the invention, portions of FIG. 1 can be equally interpreted as part of a dictation device, voice mail system, answering machine, or sound track editing device for example. By removing the wireless aspects of the system 100 including the removal of selective call transmitter 102 and radio frequency receiver 105, the system can be optionally hardwired from the voice compression circuitry 101 to the voice expansion circuitry 106 through the A/D 115 as shown with the dashed line. Thus, in a voice mail, answering machine, sound track editing or dictation system, an input device 114 would supply an acoustic input signal such as a speech signal to the terminal 113 having the voice compression circuitry 101. The voice expansion circuitry 106 and controls 110 would supply the means of listening and manipulating to the output speech signal in a voice mail, answering machine, dictation, sound track editing or other applicable system. This invention clearly contemplates that the time-scaling techniques of the claimed invention has many other applications besides paging. The paging example disclosed herein is merely illustrative of one of those applications.

Figure 3:
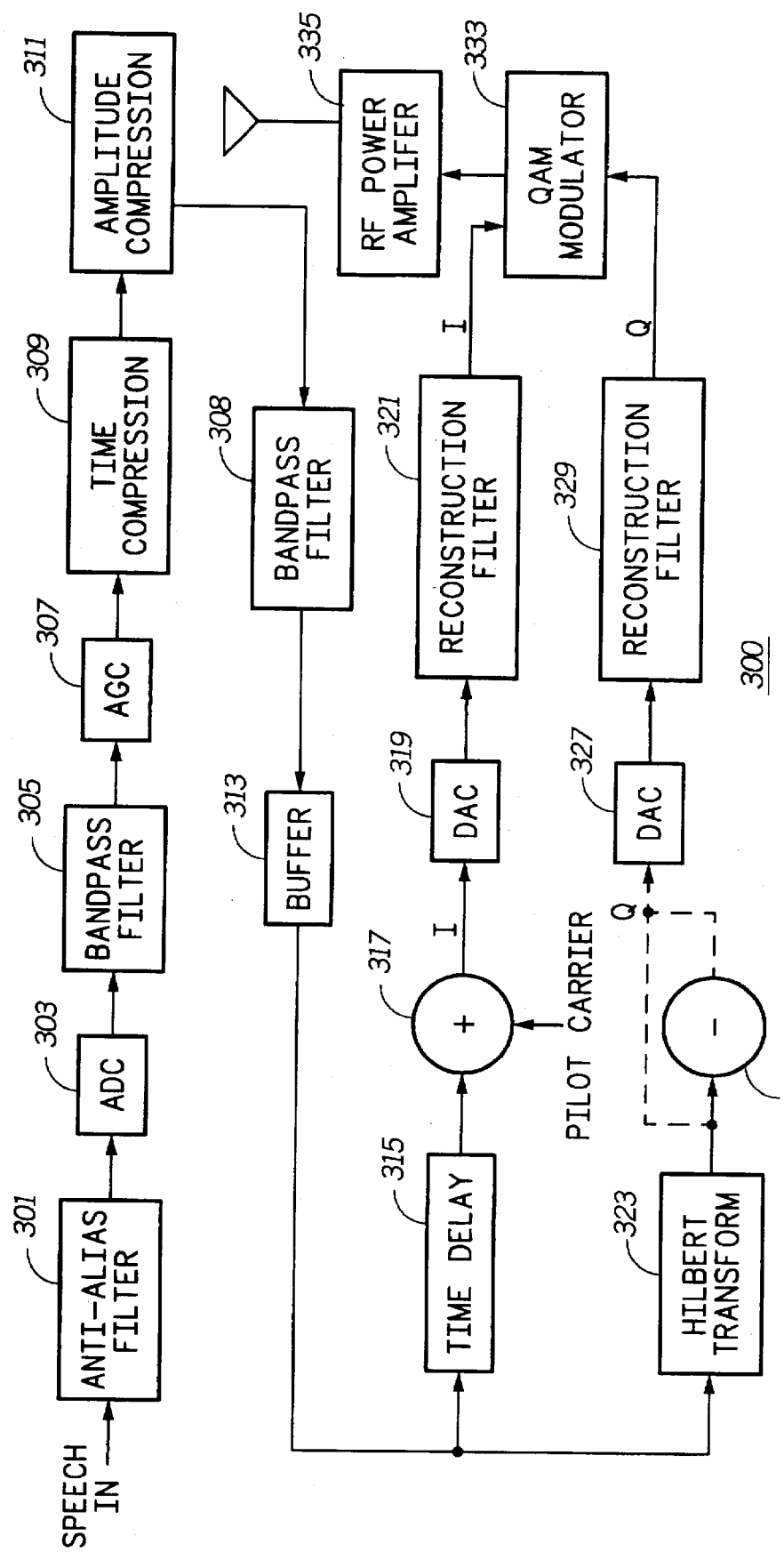
FIG. 3 is an expanded electrical block diagram of the base station transmitter in accordance with the present invention.
Figure 4:
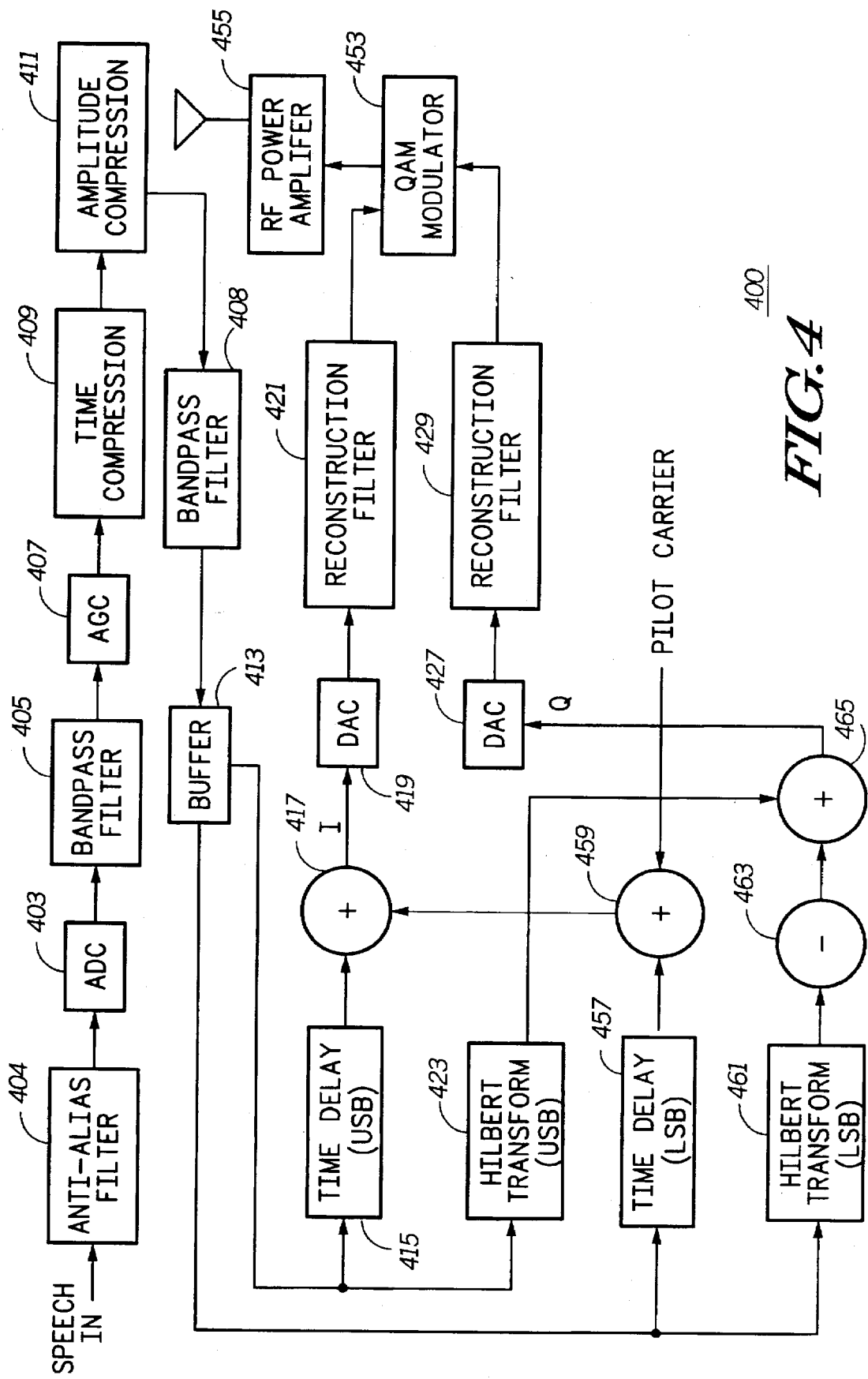
FIG. 4 is an expanded electrical block diagram of another base station transmitter in accordance with the present invention.
Figure 2:
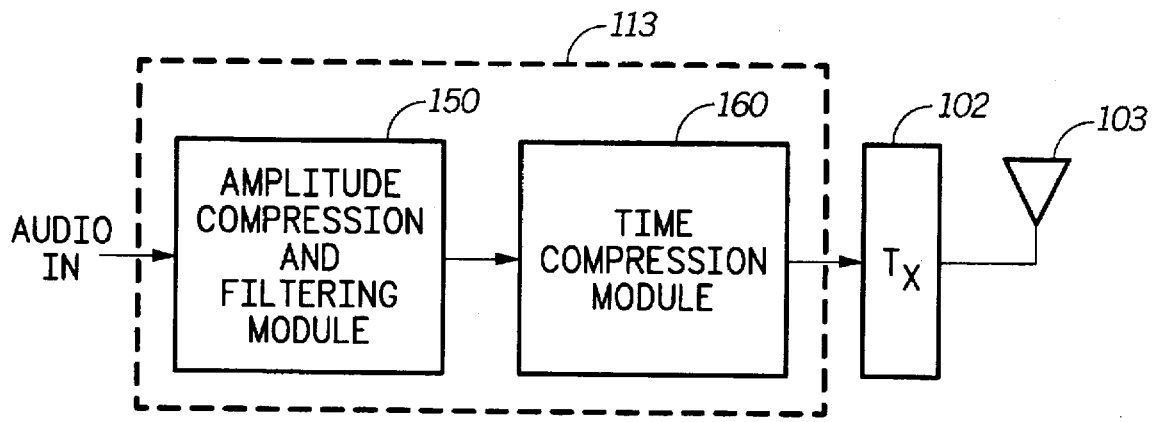
FIG. 2 is a block diagram of a base station transmitter in accordance with the present invention.

Now referring to FIG. 2, there is shown a block diagram of a paging transmitter 102 and terminal 113 including an amplitude compression and filtering module 150 coupled to a time compression module 160 which is coupled to the selective call transmitter 102 and which transmits messages using aerial or antenna 103. Referring to FIGS. 3 and 4, a lower level block diagram of the block diagram of FIG. 2 is shown.

Figure 6:
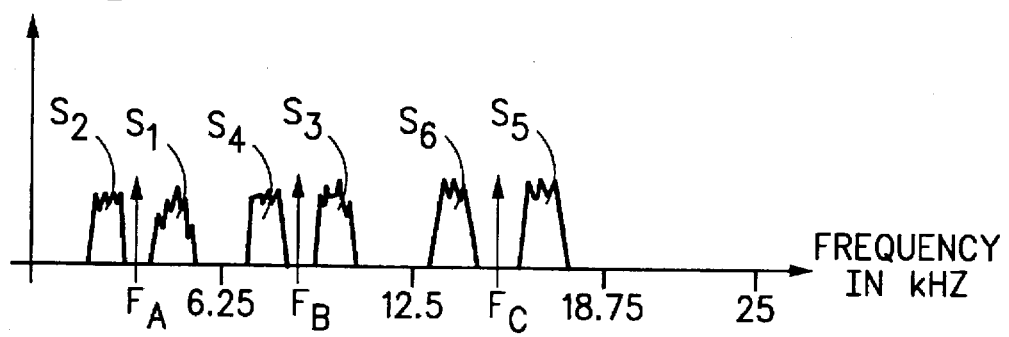
FIG. 6 is a spectrum analyzer output of a 6 single-sideband signal transmitter in accordance with the present invention.

Please keep in mind that this compressed voice paging system is highly bandwidth efficient and intended to support typically 6 to 30 voice messages per 25 kHz channel using the basic concepts of quadrature amplitude (QAM) or single-side band (SSB) modulation and time scaling of speech signals. Preferably, in a first embodiment and also referring to FIG. 6, the compressed voice channel or voice communication resource consists of 3 sub-channels that are separated by 6250 Hz. Each sub-channel consists of two side-bands and a pilot carrier. Each of these two side-bands may have the same message in a first method or separate speech messages on each sideband or a single message split between the upper and lower sidebands in a second method. The single sub-channel has a bandwidth of substantially 6250 Hz with each side-band occupying a bandwidth of substantially 3125 Hz. The actual speech bandwidth is substantially 300–2800 Hz. Alternatively, the quadrature amplitude modulation may be used where the two independent signals are transmitted directly via I and Q components of the signal to form each sub-channel signal. The bandwidth required for transmission is the same in the QAM and SSB cases.

Note that modules 150 and 160 in FIG. 2 can be repeated for use by each different voice signal (up to 6 times in 25

KHz wide channels and up to 14 times in 50 KHz wide channels) to allow for the efficient and simultaneous transmission of (up to 6 in examples shown) voice messages. They can all then be summed at a summing device (not shown, but see FIG. 5) and preferably processed as a composite signal in 102. A separate signal (not shown) contains the FM modulation of the FLEX™ protocol (as will be described later) which may optionally be generated in software or as a hardware FM signal exciter.

Preferably, in the examples shown herein, an incoming speech message is received by the terminal 113. The present system preferably uses a time-scaling scheme or technique to achieve the required compression. The preferred compression technique used in the present invention requires certain parameters specific to the incoming message to provide an optimum quality. Preferably, the technique of time-scale compression processes the speech signal into a signal having the same bandwidth characteristics as uncompressed speech. (Once these parameters are computed, speech is compressed using the desired time-scaling compression technique). This time-scaled compressed speech is then encoded using a digital coder to reduce the number of bits required to be distributed to the transmitters. In the case of a paging system, the encoded speech distributed to the transmitters of multiple simulcasting sites in a simulcasting paging system would need to be decoded once again for further processing such as amplitude compression. Amplitude compression of the incoming speech signals (preferably using a syllabic compander) is used at the transmitter to give protection against channel impairments.

A time scaling technique known as Waveform Similarity based Overlap-Add technique or WSOLA encodes speech into an analog signal having the same bandwidth characteristics as uncompressed speech. This property of WSOLA allows it to be combined with SSB or QAM modulation such that the overall compression achieved is the product of the bandwidth compression ratio of multiple QAM or SSB subchannels (in our example, 6 voice channels) and the time compression ratio of WSOLA (typically between 1 and 5). In the present invention, a modified version of WSOLA, later described and referred to as "WSOLA-SD" is used. WSOLA-SD retains the compatibility characteristics of WSOLA that allows the combination with SSB or QAM modulation.

Preferably, an Adaptive Differential Pulse Coded Modulation coder (ADPCM) is used to encode the speech into data that is subsequently distributed to the transmitters. At the transmitter, the digital data is decoded to obtain WSOLA-SD compressed speech which is then amplitude companded to provide protection against channel noise. This signal is Hilbert transformed to obtain a single-sideband signal. Alternatively, the signal is quadrature modulated to obtain a QAM signal. A pilot carrier is then added to the signal and the final signal is interpolated, preferably, to a 16 kHz sampling rate and converted to analog. This is then modulated and transmitted.

The present invention can operate as a mixed-mode (voice or digital) one or two way communications system for delivering analog voice and/or digital messages to selective call receiver units on a forward channel (outbound from the base transmitter) and for receiving acknowledgments from the same selective call receiver units which additionally have optional transmitters (on an optional reverse channel (inbound to a base receiver). The system of the present invention preferably utilizes a synchronous frame structure similar to FLEX™ (a high speed paging protocol by Motorola, Inc. and subject of U.S. Pat. No. 5,282,205, which is hereby incorporated by reference) on the forward channel for both addressing and voice messaging. Two types of frames are used: control frames and voice frames. The control frames are preferably used for addressing and delivery of digital data to selective call receivers in the form of portable voice units (PVU's). The voice frames are used for delivering analog voice messages to the PVU's. Both types of frames are identical in length to standard FLEX™ frames and both frames begin with the standard FLEX™ synchronization. These two types of frames are time multiplexed on a single forward channel. The frame structure for the present invention will be discuss in greater detail later on with regard to FIGS. 10, 11 and 12.

With regard to modulation, two types of modulation are preferably used on the forward channel of the present invention: Digital FM (2-level and 4-level FSK) and AM (SSB or QAM with pilot carrier). Digital FM modulation is used for the sync portions of both types of frames, and for the address and data fields of the control frames. AM modulation (each sideband maybe used independently or combined together in a single message) is used in the voice message field of the voice frames. The digital FM portions of the transmission support 6400 BPS (3200 Baud symbols) signaling. The AM portions of the transmissions support band limited voice (2800 Hz) and require 6.25 KHz for a pair of voice signals. The protocol, as will be shown later, takes advantage of the reduced AM bandwidth by subdividing a full channel into 6.25 KHz subchannels, and by using each subchannel and the AM sidebands for independent messages.

Voice System of the present invention is preferably designed to operate on either 25 KHz or 50 KHz forward channels, but other size spectrum is certainly within contemplation of the present invention. A 25 KHz forward channel supports a single FM control signal during control frames, and up to 3 AM subchannels (6 independent signals) during the message portion of voice frames. A 50 KHz forward channel supports two FM control signals operated in time lock during control frames, and up to 7 AM subchannels (14 independent signals) during the message portion of voice frames. Of course, other configurations using different size bandwidths and numbers of subchannels and signals are contemplated within the present invention. The examples disclosed herein are merely illustrative and indicative of the potential broad scope of the claims herein.

In addition to the spectrum efficiency achieved through modulation and sub-channelization of the spectrum, the present invention, in another embodiment, can utilize a speaker dependent voice compression technique that time scales the speech by a factor of 1 to 5 times. By using both AM sidebands (alternatively, the 2 QAM components) of a subchannel for different portions of the same message or different messages, the overall compression factor per subchannel is 2 to 10 times. Voice quality will typically decrease with an increasing time-compression factor. The compression technique preferably used in the voice system of the present invention is a modified form of a known time-scaling technique known as Waveform Similarity based Overlap-Add technique (WSOLA) as previously mentioned. The modified form of WSOLA is dependent upon the particular speaker or speech used, hence the name "WSOLA-SD" for "WSOLA-Speaker dependent", which will be discussed later on.

Operation of the present invention is enhanced when a reverse (inbound to the base receiver) channel is available. The frequency division simplex mode of operation is one inbound operating mode supported. (U.S. Pat. Nos. 4,875, 038 and 4,882,579, both assigned to assignee of the present invention, Motorola, Inc., illustrate the use of multiple acknowledge signals on an inbound channel and are incorporated herein by reference). In frequency division simplex, a separate dedicated channel (usually paired with the outbound channel) is provided for inbound transmissions. Inbound data rates of 800 to 9600 BPS are contemplated within a channel bandwidth of 12.5 KHz.

The system of the present invention can be operated in one of several modes depending on the availability of a reverse channel. When no reverse channel is available, the system is preferably operated in simulcast mode for both addressing and voice messaging. When a reverse channel is provided, the system can be operated in a targeted message mode whereby the messages are broadcast only on a single or a subset of transmitters located near the portable voice unit. The targeted message mode is characterized by simulcast addressing to locate the portable voice unit, the portable voice unit's response on the reverse channel provides the location, followed by a localized message transmission to the portable voice unit. The targeted message mode of operation is advantageous in that it provides the opportunity for subchannel reuse; and consequently, this mode of operation can lead to increased system capacity in many large systems.

FIG. 3 illustrates a block diagram of a first embodiment of a transmitter 300 in accordance with the present invention. An analog speech signal is input to an anti-aliasing low pass filter 301 which strongly attenuates all frequencies above one-half the sampling rate of an analog-to-digital converter (ADC) 303 which is further coupled to the filter 301. The ADC 303 preferably converts the analog speech signal to a digital signal so that further signal processing can be done using digital processing techniques. Digital processing is the preferred method, but the same functions could also be performed with analog techniques or a combination of analog and digital techniques.

A band pass filter 305 coupled to the ADC 303 strongly attenuates frequencies below and above its cutoff frequencies. The lower cutoff frequency is preferably 300 Hz which allows the significant speech frequencies to pass, but attenuates lower frequencies which would interfere with a pilot carrier. The upper cutoff frequency is preferably 2800 Hz which allows the significant speech frequencies to pass but attenuates higher frequencies which would interfere with adjacent transmission channels. An automatic gain control (AGC) block 307 preferably coupled to the filter 305 equalizes the volume level of different voices.

A time compression block 309 preferably coupled to the AGC block 307 shortens the time required for transmission of the speech signal while maintaining essentially the same signal spectrum as at the output of the bandpass filter 305. The time compression method is preferably WSOLA-SD (as will be explained later on), but other methods could be used. An amplitude compression block 311, and the corresponding amplitude expansion block 720 in a receiver 700 (FIG. 7), form a companding device which is well known to increase the apparent signal-to-noise ratio of the received speech. The companding ratio is preferably 2 to 1 in decibels, but other ratios could be used in accordance with the present invention. In the particular instance of a communication system such as a paging system, the devices 301–309 may be included in a paging terminal (113 of FIG. 1) and the remaining components in FIG. 3 could constitute a paging transmitter (102 of FIG. 1). In such a case, there would typically be a digital link between the paging terminal and paging transmitter. For instance, the signal after block 309 could be encoded using a pulse code modulation (PCM) technique and then subsequently decoded using PCM to reduce the number of bits transferred between the paging terminal and paging transmitter.

In any event, a second band pass filter 308 coupled to the amplitude compression block 311 strongly attenuates frequencies below and above its cutoff frequencies to remove any spurious frequency components generated by the AGC 307, the time compression block 309 or the amplitude compression block 311. The lower cutoff frequency is preferably 300 Hz which allows the significant speech frequencies to pass, but attenuates lower frequencies which would interfere with the pilot carrier. The upper cutoff frequency is preferably 2800 Hz which allows the significant speech frequencies to pass but attenuates higher frequencies which would interfere with adjacent transmission channels.

The time compressed speech samples are preferably stored in a buffer 313 until an entire speech message has been processed. This allows the time compressed speech message to then be transmitted as a whole. This buffering method is preferably used for paging service (which is typically a non real time service). Other buffering methods may be preferable for other applications. For example, for an application involving two-way real time conversation, the delay caused by this type of buffering could be intolerable. In that case it would be preferable to interleave small segments of several conversations. For example, if the time compression ratio is 3:1, then 3 real time speech signals could be transmitted via a single channel. The 3 transmissions could be interleaved on the channel in 150 millisecond bursts and the resulting delays would not be objectionable. The time compressed speech signal from the buffer 313 is applied to both to a Hilbert transform filter 323 and to a time delay block 315 which has the same delay as the Hilbert transform filter, but does not otherwise affect the signal.

The output of the time delay block 315 (through the summing circuit 317) and the Hilbert transform filter 323 form, respectively, the in-phase (I) and quadrature (Q) components of an upper sideband (USB) single sideband (SSB) signal. The output of the time delay and the negative (325) of the Hilbert transform filter form, respectively, the in-phase (I) and quadrature (Q) components of a lower sideband (LSB) single sideband signal. Thus the transmission may be on either the upper or lower sideband, as indicated by the dotted connection.

While the upper sideband is used to transmit one time compressed speech signal, the lower sideband can be used to simultaneously transmit a second time compressed speech signal by using another similar transmitter operating on the lower sideband. SSB is the preferred modulation method because of efficient use of transmission bandwidth and resistance to crosstalk. Double sideband Amplitude Modulation (AM) or frequency modulation (FM) could be used, but would require at least twice the bandwidth for transmission. It is also possible to transmit one time compressed speech signal directly via the I component and a second time compressed speech signal directly via the Q component, however, in the present embodiment this method is subject to crosstalk between the two signals when multipath reception occurs at the receiver.

A direct current (DC) signal is added to the I component of the signal to generate the pilot carrier, which is transmitted along with the signal and used by the receiver (700) to substantially cancel the effects of gain and phase variations or fading in the transmission channel. The I and Q components of the signal are convened to analog form by digitalto-analog converters (DAC) 319 and 327 respectively. The two signals are then filtered by low pass reconstruction filters 321 and 329 respectively to remove spurious frequency components resulting from the digital-to-analog conversion process. A quadrature amplitude modulation (QAM) modulator 333 modulates the I and Q signals onto a radio frequency (RF) carrier at low power level. Other modulation methods, e.g. direct digital synthesis of the modulated signal would accomplish the same purpose as the DACs (319 and 327), reconstruction filters (321 and 329), and QAM modulator 333. Finally, a linear RF power amplifier 335 amplifies the modulated RF signal to the desired power level, typically 50 watts or more. Then, the output of the RF power amplifier 335 is coupled to the transmitting antenna. Other variations can produce essentially the same results. For example, the amplitude compression could be performed before the time compression, or omitted altogether and the device would still perform essentially the same function.

FIG. 4 illustrates a block diagram of a second embodiment of a transmitter 400 in accordance with the present invention. In FIG. 4, both the upper and lower sidebands are used to simultaneously transmit different portions of the same time compressed signal. The transmitter 400 preferably includes an anti-alias filter 404, an ADC 403, a bandpass filter 405, an AGC 407, a time compression block 409, an amplitude compression block 411, and a bandpass filter 408 coupled and configured as in FIG. 3. Operation of the transmitter of FIG. 4 is the same as in FIG. 3 until an entire speech message has been processed and stored in a buffer 413. The time compressed speech samples stored in the buffer 413 are then divided to be transmitted on either the upper or lower sideband. Preferably, the first half of the time compressed speech message is transmitted via one sideband and the second half of the time compressed speech message is transmitted via the other sideband (or alternatively on each of the I and Q components directly).

The first portion of time compressed speech signal from the buffer 413 is applied to both a first Hilbert transform filter 423 and to a first time delay block 415 which has the same delay as the Hilbert transform filter 423 but does not otherwise affect the signal. The output of the first time delay (through summing circuit 417) and the first Hilbert transform filter 423 (through summing circuit 465) are In-Phase (I) and Quadrature Phase (Q) signal components which, when coupled to I and Q inputs of the QAM modulator, generate upper sideband signal having information only from the first portion of time compressed speech samples. The second time compressed speech signal from the buffer 413 is applied to both a second Hilbert transform filter 461 and to a second time delay block 457 which has the same delay as the Hilbert transform filter 461 but does not otherwise affect the signal. The output of the second time delay (through summing circuits 459 and 417) and the negative (463) of the output of the second Hilbert transform filter 461 (and again, through summing circuit 465) are In-Phase (I) and Quadrature Phase (Q) signal components which, when coupled to I and Q inputs of the QAM modulator, generate upper sideband signal having information only from the second portion of time compressed speech samples. The I components of the upper and lower sideband signals are added with a DC pilot carrier component (through summing circuit 459) to form a composite I component for transmission. The Q components of the upper and lower sideband signals are added (through summing circuit 465) to form a composite Q component for transmission. It will be appreciated that elements 415, 423, 457, 461, 417, 459, 463, 465, 419, 427, 421, and 429 form a preprocessor which generates preprocessed I and Q signal components, which when coupled to the QAM modulator 453 generate the low level subchannel signal with a subcarrier $F_A$, having two single sideband signals, which have independent information on each sideband.

The transmitter 400 further comprises DACs 419 and 427, reconstruction filters 421 and 429, QAM modulator 433, and RF power amplifier 455 arranged and constructed as described in FIG. 3. Operation of the rest of the transmitter of FIG. 4 is the same as in FIG. 3.

Preferably, in both transmitters 300 and 400 of FIGS. 3 and 4 respectively, only the anti-alias filters, the reconstruction filters, the RF power amplifier and optionally the Analog to Digital converter and digital to analog converters are separate hardware components. The remainder of the devices can preferably be incorporated into software which could be run on a processor, preferably a digital signal processor.

FIG. 7 illustrates a block diagram of a receiver 700 which preferably operates in conjunction with the transmitter 300 of FIG. 3 in accordance with the present invention. A receiving antenna is coupled to a receiver module 702. The receiver module 702 includes conventional receiver elements, such as RF amplifier, mixer, bandpass filter, and intermediate frequency (IF) amplifier (not shown). A QAM demodulator 704 detects the I and Q components of the received signal. An analog-to-digital converter (ADC) 706 converts the I and Q components to digital form for further processing. Digital processing is the preferred method, but the same functions could also be performed with analog techniques or a combination of analog and digital techniques. Other methods of demodulation, e.g., a sigma-delta converter, or direct digital demodulation, would accomplish the same purpose as the QAM demodulator 704 and ADC 706.

A feedforward automatic gain control (AGC) block 708 uses the pilot carrier, transmitted along with the time compressed speech signal, as a phase and amplitude reference signal to substantially cancel the effects of amplitude and phase distortions occurring in the transmission channel. The outputs of the feedforward automatic gain control are corrected I and Q components of the received signal. The corrected Q component is applied to a Hilbert transform filter 712, and the corrected I component is applied to a time delay block 710 which has the same delay as the Hilbert transform filter 712 but does not otherwise affect the signal.

If the time compressed speech signal was transmitted on the upper sideband, the output of the Hilbert transform filter 712 is added (through summing circuit 714) to the output of the time delay block 710 to produce the recovered time compressed speech signal. If the time compressed speech signal was transmitted on the lower sideband, the output of the Hilbert transform filter 712 is subtracted (716) from the output of the time delay block 710 to produce the recovered time compressed speech signal. The recovered time compressed speech signal is preferably stored in a buffer 718 until an entire message has been received. Other buffering methods are also possible. (See the discussion with FIG. 3.)

An amplitude expansion block 720 works in conjunction with the amplitude compression block 311 of FIG. 3 to perform the companding function. A time expansion block 722 works in conjunction with the time compression block 309 of FIG. 3 and preferably reconstructs the speech into its natural time frame for an audio output through transducer 724 or other time frames as other applications may suggest.

One application could optionally include the transfer of digitized voice to a computing device 726, where the receiver-to-computer interface can be a PCMCIA or RS-232 interface or any number of interfaces known in the art. The time compression method is preferably WSOLA-SD, but other methods could be used, so long as complementary methods are used in the transmitter and receiver. Other variations in configuration can produce essentially the same results. For example, the amplitude compression could be performed after the time compression, or omitted altogether and the device would still perform essentially the same function.

Figure 8:
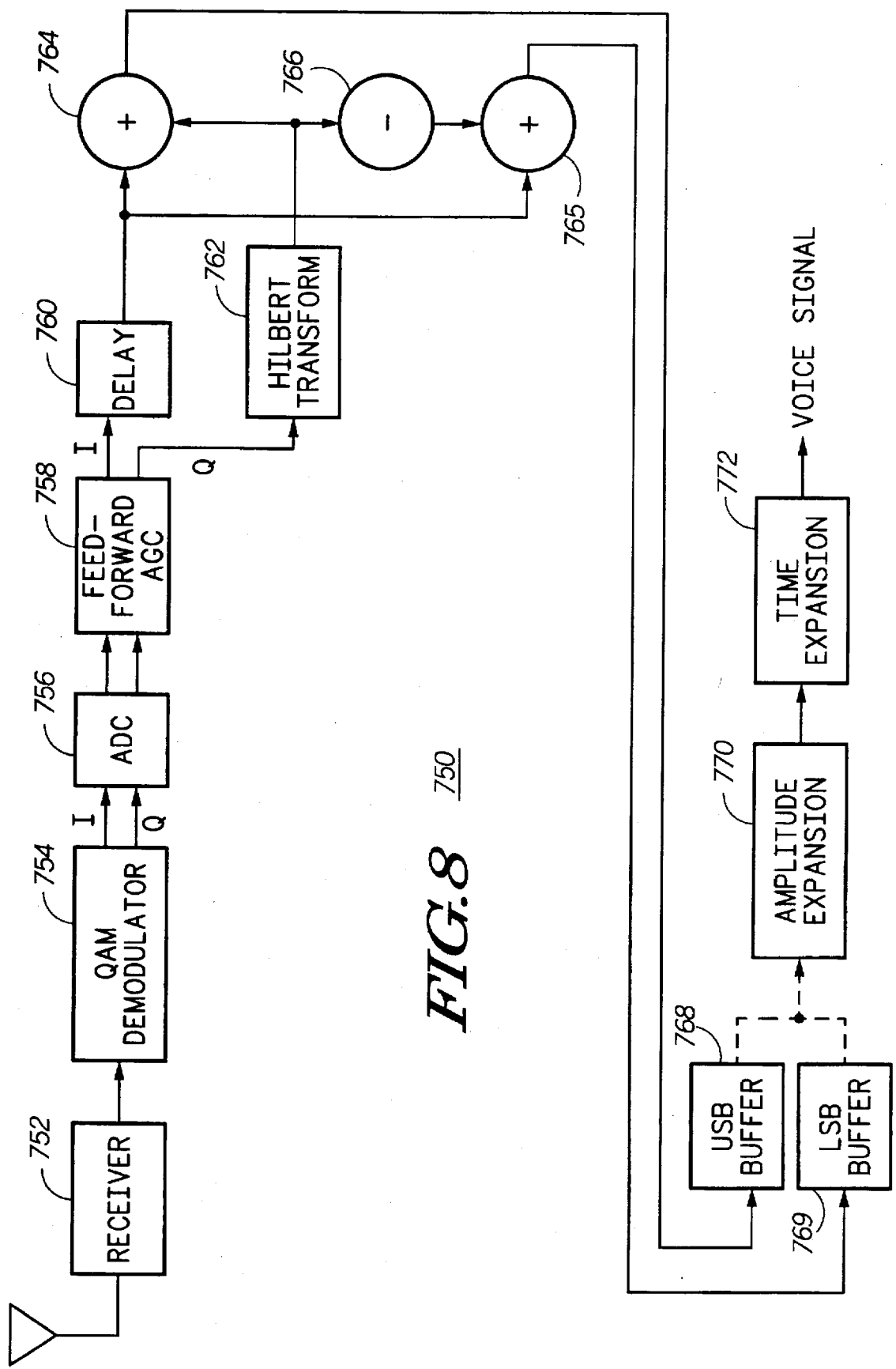
FIG. 8 is an expanded electrical block diagram of another selective call receiver in accordance with present invention.

FIG. 8 illustrates a block diagram of a receiver 750 which operates in conjunction with the transmitter of FIG. 400 in accordance with the present invention. The receiver of FIG. 8 comprises an antenna, receiver module 752, a QAM modulator 754, an ADC 756, a Feed-forward AGC 758, a time delay block 760, and a Hilbert transform filter 762 arranged and constructed as described in FIG. 7. Operation of the receiver of FIG. 8 is the same as FIG. 7, up to the output of the time delay block 760 and Hilbert transform filter 762. The output of the Hilbert transform filter 762 is added to the output of the time delay block 760 (through summing circuit 764) to produce the recovered time compressed speech signal corresponding to the first half of the speech message which was transmitted on the upper sideband. The output of the Hilbert transform filter 762 is subtracted (766) from the output of the time delay block 760 to produce the recovered time compressed speech signal corresponding to the second half of the speech message which was transmitted on the lower sideband.

The two recovered time compressed speech signals are stored in either respective upper sideband and lower sideband buffers 768 or 769 until the entire message has been received. Then, the signal corresponding to the first half of the message and the signal corresponding to the second half of the message are applied sequentially to the amplitude expansion block 770. An amplitude expansion block 770 works in conjunction with the amplitude compression block 411 of FIG. 4 to perform the companding function.

The operation of the rest of the receiver of FIG. 8 is the same as FIG. 7. A time expansion block 772 works in conjunction with the time compression block 409 of FIG. 4 and preferably reconstructs the speech into its natural time frame or other time frames as other applications may suggest or require. The time compression method is preferably WSOLA-SD, but other methods could be used, so long as complementary methods are used in the transmitter and receiver. Other configurations can produce essentially the same results. For example, the amplitude compression could be performed after the time compression, or omitted altogether and the device would still perform essentially the same function.

As with the implementation of the transmitters of FIGS. 3 and 4, many of the components in FIGS. 7 and 8 can be implemented in software including, but not limited to the AGCs, the single-sideband or QAM demodulators, summation circuits, the amplitude expansion blocks, and the time expansion blocks. All the other components are preferably implemented in hardware.

Figure 5:
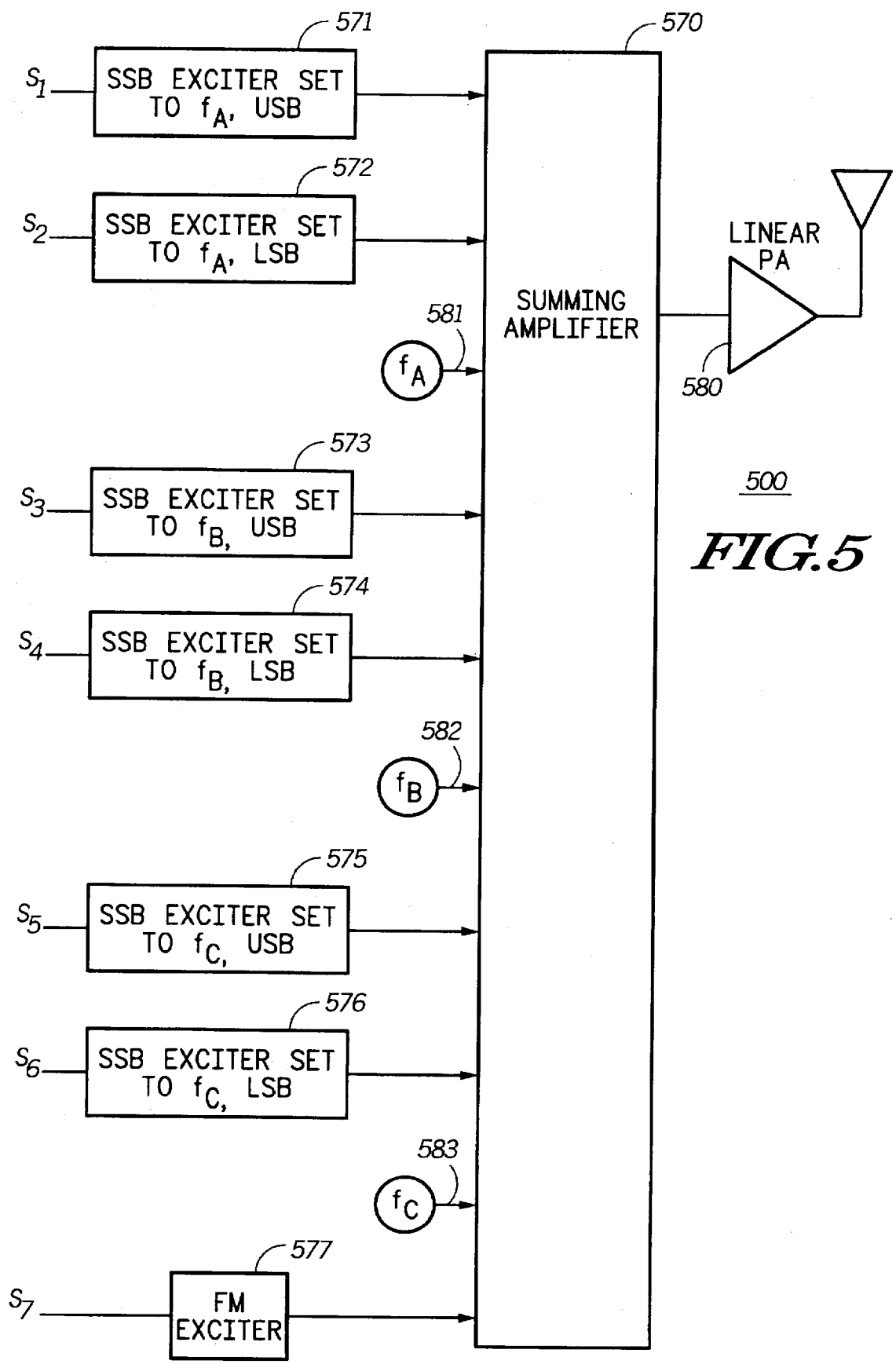
FIG. 5 is block diagram of a speech processing, encoding, and modulation portion of a base station transmitter in accordance with the present invention.

If the speech processing, encoding and modulation portion of the present invention were to be implemented into hardware, the implementation of FIG. 5 could be used. For instance, transmitter 500 of FIG. 5 would include a series of pairs of single-sideband exciters (571–576) set to the frequencies of their respective pilot carriers (581–583). Exciters 571–576 and pilot carriers 581–583 correspond to the separate voice processing paths. All these signals, including a signal from an FM signal exciter 577 (for the digital FM modulation used for the synchronization, address and data fields previously described) would be fed into a summing amplifier 570 which in turn is amplified by a linear amplifier 580 and subsequently transmitted. The low level output of FM exciter 577 is also linearly combined in summing amplifier 570. The composite output signal of summing amplifier 570 is amplified to the desired power level, usually 50 watts or more, by linear RF power amplifier 580. The output of linear RF power amplifier 580 is then coupled to the transmitting antenna.

Other means could be used to combine several subchannel signals. For example, the several digital baseband I and Q signals, obtained at the outputs of 417 and 465 in FIG. 4, could be translated in frequency to their respective subcarrier offset frequencies, combined in digital form, then converted to analog form for modulation onto the carrier frequency.

Figure 9:
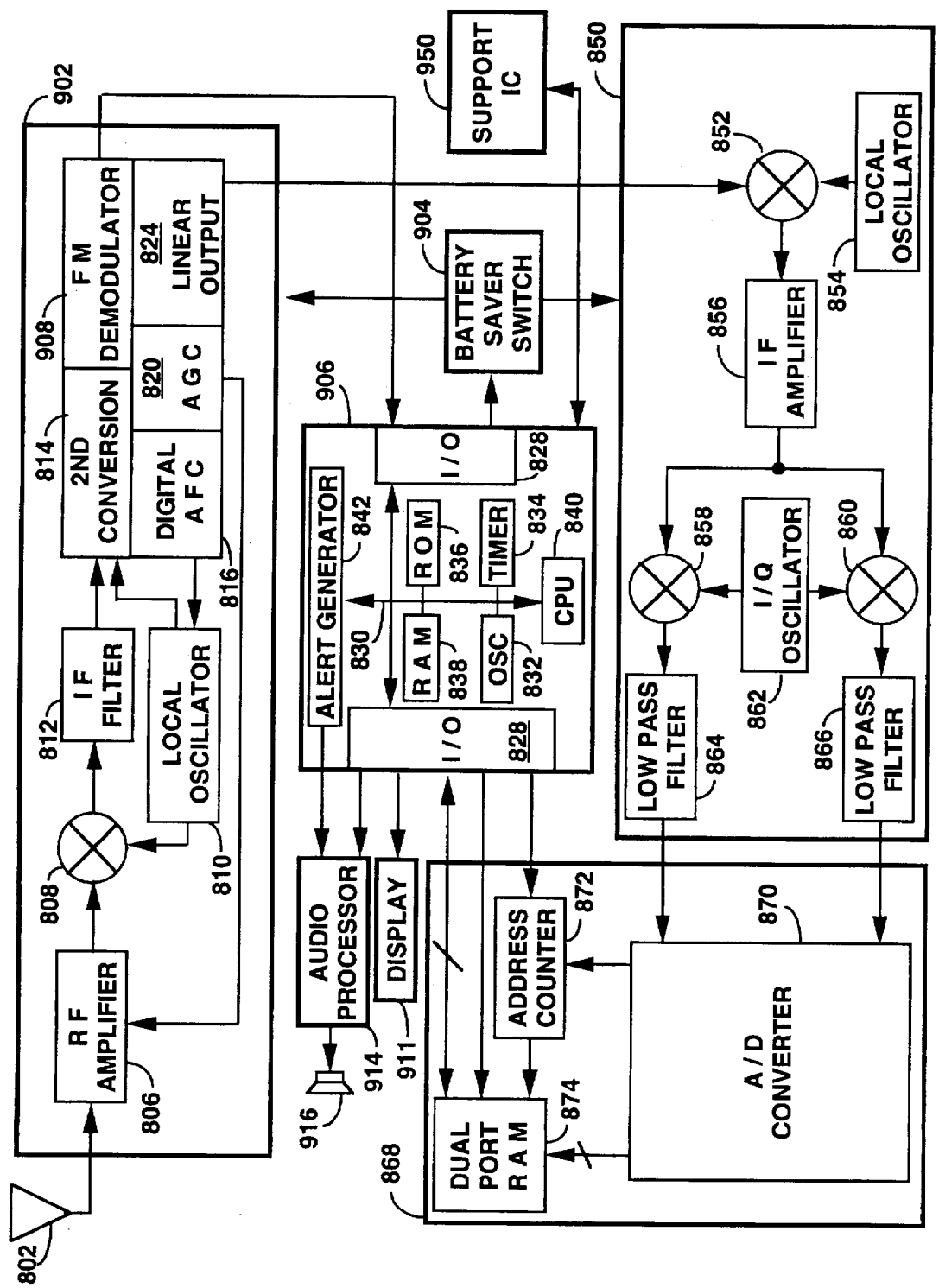
FIG. 9 is an expanded electrical block diagram of another selective call receiver in accordance with present invention.

Referring to FIG. 9, there is shown another receiver unit 900 in accordance with the present invention. Receiver 900 additionally incorporates a means for detecting and decoding the FM modulated control signals that are used in the FLEX™ signaling protocol. Block 902 is the receiver front end and an FM back end. A digital automatic frequency controller (DAFC) and automatic gain controller (AGC) are incorporated into block 902. Block 906 includes the radio processor with a support chip 950 and Blocks 911, 914, and 916 include all the output devices. Block 904 is the battery saver or battery economy circuit which operates under control of the processor 906. Block 850 is the linear decoder followed by an analog-to-digital converter and random access memory (RAM) Block 868. The receiver Block 902 is preferably a modified FM receiver including the addition of a DAFC as described in U.S. Pat. No. 5,239,306 (which is assigned to the assignee of the present invention and which is hereby incorporated by reference herein), an AGC, and which provides for an intermediate frequency (IF) output at a point following most of the receiver gain but prior to the FM demodulator.

The same processor that controls Motorola's FLEX™ protocol compatible pagers would adequately handle all the protocol functions in the present invention including the address recognition and message decoding of an FM demodulated signal. Additionally, in response to an FM modulated address (and perhaps message pointer code words), the processor 906 initiates the operation of the analog-to-digital conversion and of the RAM Block 868. Block 868 samples either or both the I (In-phase) and Q (quadrature) linearly modulated signals at the outputs of the linear decoder block 850. The signal samples are written directly to RAM with the aid of an address counter and in response to a control signal from the processor 906.

A voice can be sent as an SSB signal occupying a single voice bandwidth on the channel, or equivalently on either of the I or Q channels as was described earlier. Each of the I and Q signals simultaneously occupy the same RF bandwidth as two analog-single sidebands (SSB). Voice bandwidths are on the order of 2.8 KHz, so a typical signal sampling rate of about 6.4 KHz each is required of the analog-to-digital converter if analog-SSB is recovered from the I and Q channel information. The analog-to-digital converter samples with 8 bit precision (although as much as 10 bits is preferred). Direct memory access by the analog-to-digital converter allows the use of a processor whose speed and power are not a direct function of the channel data rate. That is, a microprocessor can be used with direct memory access, whereas, a significantly higher speed processor would be required if the analog-to-digital converted data were read to memory through the microprocessor.

The analog-to-digital converter (A/D), the dual port RAM and the address counter are grouped as block 868. A second RAM I/O port can be serial or parallel, and operates at a 6 or 12K sample per second rate. A second RAM I/O port is provided so that the processor can extract the sampled voice or data, process the demodulation function, and expand the compressed voice or format the data. The restored voice is played back through the voice processor 914 and transducer 916, while formatted data can be displayed on display 911.

Again, referring to FIG. 9, an expanded electrical block diagram is used to describe in further detail the receiver operation of the dual mode communication receiver of the present invention. The transmitted information signal, modulated in the FM modulation format, or in a linear modulation format (such as SSB), is intercepted by the antenna 802 which couples the information signal to the receiver section 902, and in particular to the input of the radio frequency (RF) amplifier 806. The message information is transmitted on any suitable RF channel, such as those in the VHF bands and UHF bands. The RF amplifier 806 amplifies the received information signal, such as that of a signal received on a 930 MHz paging channel frequency, coupling the amplified information signal to the input of the first mixer 808. The first oscillator signal, which is generated in the preferred embodiment of the present invention by a frequency synthesizer or local oscillator 810, also couples the first mixer 808. The first mixer 808 mixes the amplified information signal and the first oscillator signal to provide a first intermediate frequency, or IF, signal, such as a 45 MHz IF signal, which is coupled to the input of the first IF filter 812. It will be appreciated that other IF frequencies can be utilized as well, especially when other paging channel frequencies are utilized. The output of the IF filter 812 which is the on-channel information signal, is coupled to the input of the second conversion section 814, which will be described in further detail below. The second conversion section 814 mixes the on-channel information signal to a lower intermediate frequency, such as 455 KHz, using a second oscillator signal, which is also generated by the synthesizer 810. The second conversion section 814 amplifies the resultant intermediate frequency signal, to provide a second IF signal which is suitable to be coupled to either the FM demodulator section 908 or to the linear output section 824.

Receiver section 804 operates in a manner similar to a conventional FM receiver, however, unlike a convention FM receiver, the receiver section 804 of the present invention also includes an automatic frequency control section 816 which is coupled to the second conversion section 814, and which appropriately samples the second IF signal to provide a frequency correction signal which is coupled to the frequency synthesizer 810 to maintain the receiver tuning to the assigned channel. The maintenance of receiver tuning is especially important for the proper reception of QAM (that is, I and Q components) and/or SSB information which is transmitted in the linear modulation format. The use of a frequency synthesizer to generate the first and second oscillator frequencies enables the operation selection of the receiver on multiple operating frequencies, selected such as by code memory programming and/or by parameters received over the air, as for example, in the FLEX™ protocol. It will be appreciated that other oscillator circuits, such as fixed frequency oscillator circuits which can be adjusted by a frequency correction signal from the automatic frequency control section 816, can be utilized as well.

An automatic gain control 820 is also coupled to the second conversion section 814 of the dual mode receiver of the present invention. The automatic gain control 820 estimates the energy of samples of the second IF signal and provides a gain correction signal which is coupled to the RF amplifier 806 to maintain a predetermined gain for the RF amplifier 806. The gain correction signal also couples the second conversion section 814 to maintain a predetermined gain for the second conversion section 814. The maintenance of the gain of the RF amplifier 806 and the second conversion section 814 is required for proper reception of the high speed data information transmitted in the linear modulation format, and further distinguishes the dual mode receiver of the present invention from a conventional FM receiver.

When the message information or control data is transmitted in the FM modulation format, the second IF signal is coupled to the FM demodulator section 908, as will be explained in detail below. The FM demodulator section 908 demodulates the second IF signal in a manner well known to one of skill in the art, to provide a recovered data signal, which is a stream of binary information corresponding to the received address and message information transmitted in the FM modulation format. The recovered data signal coupled to the input of a microcomputer 906, which function as a decoder and controller, through an input of input/output port, or I/O port 828. The microcomputer 906 provide complete operational control of the communication receiver 900, providing such functions as decoding, message storage and retrieval, display control, and alerting, just to name a few. The device 906 is preferably a single chip microcomputer such as the MC68HC05 microcomputer manufactured by Motorola, and includes CPU 840 for operational control. An internal bus 830 connects each of the operational elements of the device 906. I/O port 828 (shown split in FIG. 9) provides a plurality of control and data lines providing communications to device 906 from external circuits, such as the battery saver switch 904, audio processor 914, a display 911, and digital storage 868. A timing means, such as timer 834 is used to generate the timing signals required for the operation of the communication receiver, such as for battery saver timing, alert timing, and message storage and display timing. Oscillator 832 provides the clock for operation of CPU 840, and provides the reference clock for timer 834. RAM 838 is used to store information utilized in executing the various firmware routines controlling the operation of the communication receiver 900, and can also be used to store short messages, such as numeric messages. ROM 836 contains the firmware routines used to control the device 906 operation, including such routines as required for decoding the recovered data signal, battery saver control, message storage and retrieval in the digital storage section 868, and general control of the pager operation and message presentation. An alert generator 842 provides an alerting signal in response to decoding the FM modulated signaling information. A code memory 910 (not shown) couples the microcomputer 906 through the I/O port 828. The code memory is preferably an EEPROM (electrically erasable programmable read only memory) which stores one or more predetermined addresses to which communication receiver 900 is responsive.

When the FM modulated signaling information is received, it is decoded by the device 906, functioning as a decoder in a manner well known to one skilled in the art. When the information in the recovered data signal matches any of the stored predetermined addresses, the subsequently received information is decoded to determine if additional information is directed to the receiver which is modulated in the FM modulation format, or if the additional information is modulated in the linear modulation format. When the additional information is transmitted in the FM modulation format, the recovered message information is received and stored in the microcomputer RAM 838, or in the digital storage section 868, as will be explained further below, and an alerting signal is generated to alert generator 842. The alerting signal is coupled to the audio processing circuit 914 which drives transducer 916, delivering an audible alert. Other forms of sensible alerting, such as tactile or vibrating alert, can also be provided to alert the user as well.

When additional information is to be transmitted in the linear modulation format (such as SSB or "I and Q"), the microcomputer 906 decodes pointer information. The pointer information includes information indicating to the receiver on what combination of sidebands (or on what combination of I and Q components) within the channel bandwidth that the additional information is to be transmitted. The device 906 maintains the operation of monitoring and decoding information transmitted in the FM modulation format, until the end of the current batch, at which time the supply of power is suspended to the receiver until the next assigned batch, or until the batch identified by the pointer is reached, during which high speed data is transmitted. The device 906, through I/O port 828 generates a battery saving control signal which couples to battery saver switch 904 to suspend the supply of power to the FM demodulator 908, and to supply power to linear output section 824, the linear demodulator 850, and the digital storage section 868, as will be described below.

The second IF output signal, which now carries the SSB (or "I and Q") information is coupled to the linear output section 824. The output of the linear output section 824 is coupled to the quadrature detector 850, specifically to the input of the third mixer 852. A third local oscillator also couples to the third mixer 852, which is preferably in the range of frequencies from 35–150 kHz, although it will be appreciated that other frequencies may be utilized as well. The signal from the linear output section 824 is mixed with the third local oscillator signal 854, producing a third IF signal at the output of the third mixer 852, which is coupled to a third IF amplifier 856. The third IF amplifier is a low gain amplifier which buffers the output signal from the input signal. The third output signal is coupled to an I channel mixer 858 and a Q channel mixer 860. The I/Q oscillator 862 provides quadrature oscillator signals at the third IF frequency which are mixed with the third output signals in the I channel mixer 858 and the Q channel mixer 860, to provide baseband I channel signals and Q channel signals at the mixer outputs. The baseband I channel signal is coupled to a low pass filter 864, and the baseband Q channel signal is coupled to a low pass filter 866, to provide a pair of baseband audio signals which represent the compressed and companded voice signals.

The audio signals are coupled to the digital storage section 868, in particular to the inputs of an analog to digital converter 870. The A/D converter 870 samples the signals at a rate at least twice the highest frequency component at the output of 864 and 866. The sampling rate is preferably 6.4 kilohertz per I and Q channel. It will be appreciated, that the data sampling rate indicated is for example only, and other sampling rates may be used depending upon the bandwidth of the audio message received.

During the batch when the high speed data is transmitted, the microprocessor 906 provides a count enabling signal which is coupled to the address counter 872. the A/D converter 870 is also enable to allow sampling of the information symbol pairs. The A/D converter 870 generates high speed sample clock signals which are used to clock the address counter 872 which in turn sequentially generates addresses for loading the sampled voice signals into a dual port random access memory 874 through data lines going from the converter 870 to the RAM 874. The voice signals which have been loaded at high speed into the dual port RAM 874 in real time, are processed by the microcomputer 906 after all voice signals have been received, thereby producing a significant reduction in the energy consumed by not requiring the microcomputer 906 to process the information in real time. The microcomputer 906 accesses the stored signals through data lines and address lines, and in the preferred embodiment of the present invention, processes the information symbol pairs to generate either ASCII encoded information in the case of alphanumeric data having been transmitted, or digitized sampled data in the case voice was transmitted. The digitized voice samples can alternatively stored in other formats such as BCD, CVSD, or LPC based forms and other types as required. In the case of time compressed voice signals, the I and Q components sampled by ADC converter 870 are further processed by CPU 840 via dual port RAM 874 and I/O 828 to (1) amplitude expand the audio signal and (2) time-expand the signal as was described in the similar operation of the receivers of FIGS. 7 and 8. The voice is then stored again in RAM 874. The ASCII encoded or voice data is stored in the dual port RAM until the information is requested for presentation by the communication receiver user. The stored ASCII encoded data is recovered by the user using switches (not shown) to select and read the stored messages. When the stored ASCII encoded message is to be read, the user selects the message to be read and actuates a read switch which enable microcomputer 906 to recover the data, and to present the recovered data to a display 911, such as a liquid crystal display. When a voice message is to be read, the user selects the message to be read and actuates a read switch which enables the microcomputer 906 to recover the data from the dual port RAM, and to present the recovered data to the audio processor 914 which converts the digital voice information into an analog voice signal which is coupled to a speaker 916 for presentation of the voice message to the user. The microcomputer 906 can also generate a frequency selection signal which is coupled to frequency synthesizer 810 to enable the selection of different frequencies as previously described.

Figure 10:
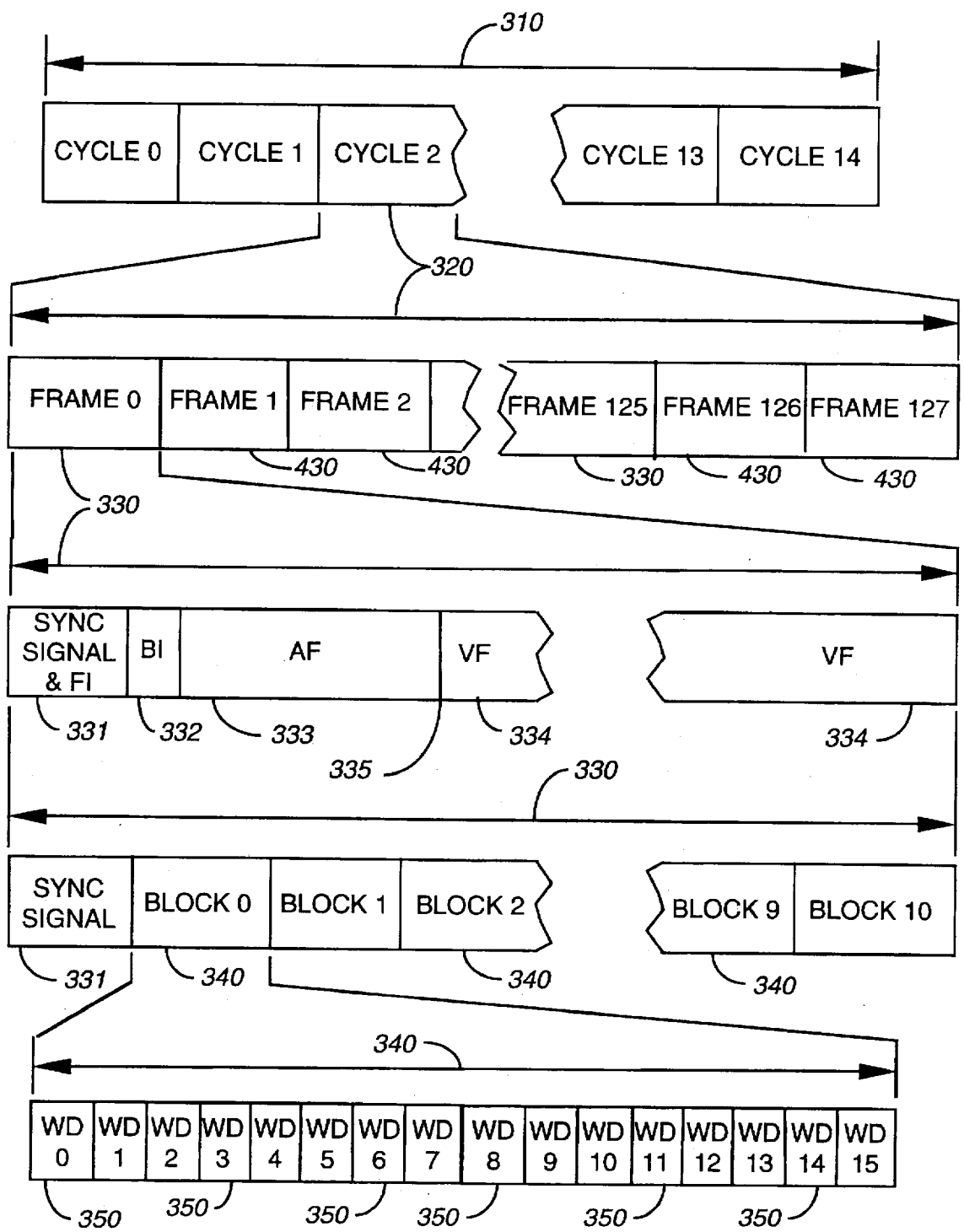
FIG. 10 is a timing diagram showing the transmission format of an outbound signaling protocol in accordance with the present invention.

Referring to FIG. 10, a timing diagram is shown which illustrates features of the FLEX™ coding format on outbound signaling utilized by the radio communication system 100 of FIG. 1, and which includes details of a control frame 330, in accordance with the preferred embodiment of the present invention. Control frames are also classified as digital frames. The signaling protocol is subdivided into protocol divisions, which are an hour 310, a cycle 320, frames 330, 430 a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including digital frames 330 and analog frames 430 are transmitted in each of the cycles 320. Normally, all one hundred twenty eight frames are transmitted. One synchronization and Frame Information signal 331 lasting one hundred fifteen milliseconds and 11 one hundred sixty millisecond uniquely identified blocks 340 are transmitted in each of the control frames 330. Bit rates of 3200 bits per second (bps) or 6400 bps are preferably used during each control frame 330. The bit rate during each control frame 330 is communicated to the selective call radios 106 during the synchronization signal 331. When the bit rate is 3200 bps, 16 uniquely identified 32 bit words are included in each block 340, as shown in FIG. 10. When the bit rate is 6400 bps 32 uniquely identified 32 bit words are included in each block 340 (not shown). In each word, at least 11 bits are used for error detection and correction, and 21 bits or less are used for information, in a manner well known to one of ordinary skill in the art. The bits and words 350 in each block 340 are transmitted in an interleaved fashion using techniques well known to one of ordinary skill in the art to improve the error correction capability of the protocol.

Information is included in each control frame 330 in information fields, comprising Frame structure information in a block information field (BI) 332, one or more selective call addresses in an address field (AF) 333, and one or more vectors in a vector field (VF) 334. The vector field 334 starts at a vector boundary 334. Each vector in the vector field 334 corresponds to one of the addresses in the address field 333. The boundaries of the information fields 332, 333, 334 are defined by block information field 332. Information fields 332, 333, 334 are variable, depending on factors such as the type of system information included in the sync and frame information field 331 and the number of addresses included in the address field 333, and the number and type of vectors included in the vector field 334.

Figure 11:
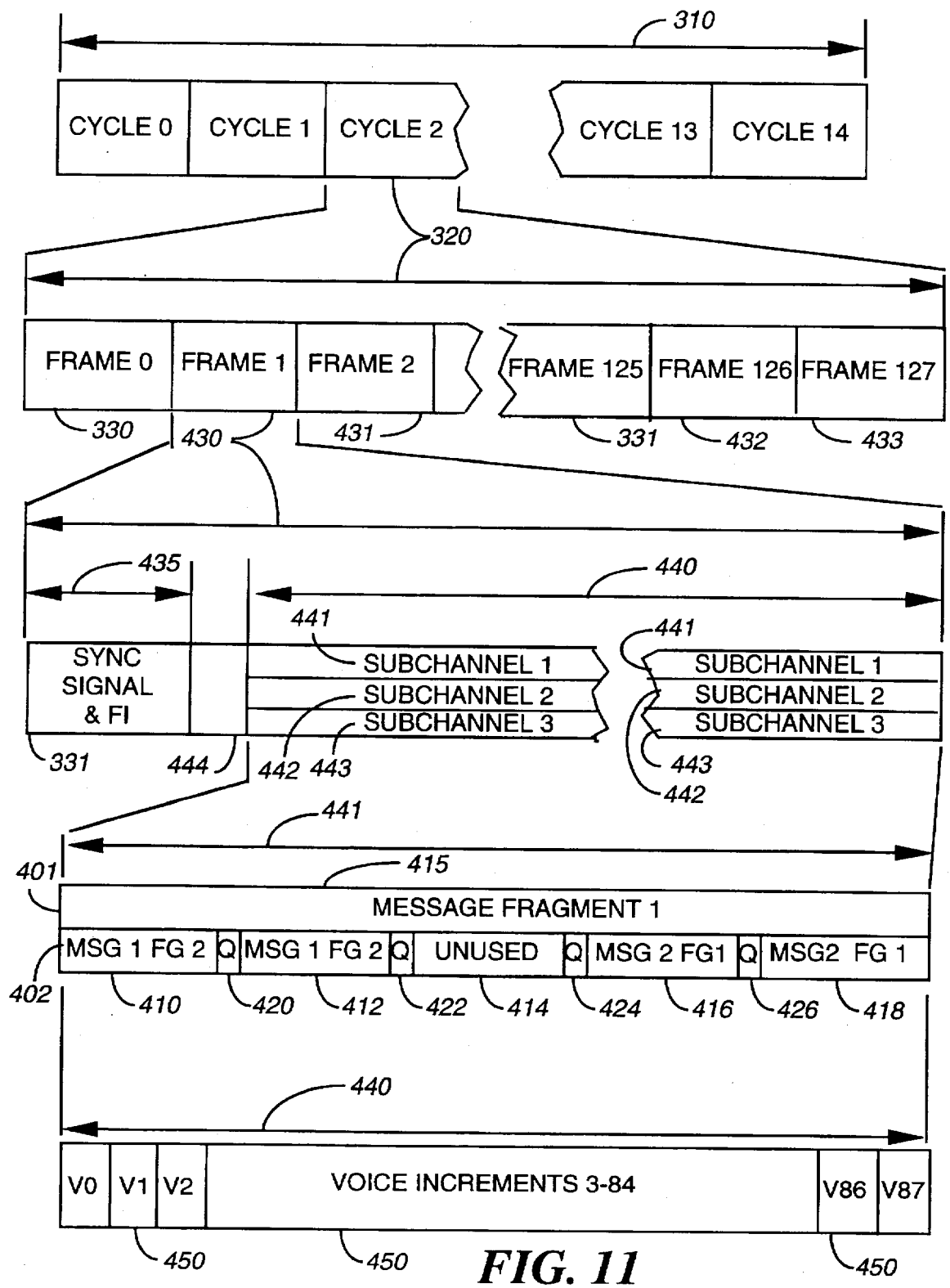
FIG. 11 is another timing diagram showing the transmission format of an outbound signaling protocol including details of a voice frame in accordance with the present invention.

Referring to FIG. 11, a timing diagram is shown which illustrates features of the transmission format of the outbound signaling protocol utilized by the radio communication system of FIG. 1, and which includes details of a voice frame 430, in accordance with the preferred embodiment of the present invention. Voice frames are also classified herein as analog frames. The durations of the protocol divisions hour 310, cycle 320, and frame 330, 430 are identical to those described with respect to a control frame in FIG. 10. Each analog frame 430 has a header portion 435 and an analog portion 440. The information in the synchronization and frame information signal 331 is the same as the synchronization signal 331 in a control frame 330. As described above, the header portion 435 is frequency modulated and the analog portion 440 of the frame 430, is amplitude modulated. A transition portion 444 exists between the header portion 435 and analog portion 440. In accordance with the preferred embodiment of the present invention, the transition portion includes amplitude modulated pilot subcarriers for up to three subchannels 441, 442, 443. The analog portion 440 illustrates the three subchannels 441, 442, 443 which are transmitted simultaneously, and each subchannel includes an upper sideband signal 401 and a lower sideband signal 402 (or alternatively, an in-phase and a quadrature signal). In the example illustrated in FIG. 11, the upper sideband signal 401 includes one message fragment 415, which is a first fragment of a first analog message. Included in the lower sideband 402 are four quality assessment signals 420, 422, 424, 426, four message segments 410, 412, 416, 418, and one segment 414 (unused in this example). The two segments 410, 412 are segments of a second fragment of the first analog message. The two segments 416, 418 are segments of a first fragment of a second analog message. The first and second analog messages are compressed voice signals which have been fragmented for inclusion in the first subchannel 441 of frame one 430 of cycle 2 of 320. The second fragment of the first message and the first fragment of the second message are each split to include a quality assessment signal 420, 426, which are repeated at predetermined positions in the lower sideband 402 of each of the three subchannels 441, 442, 443. The smallest segment of message included in an analog frame is defined as a voice increment 450, of which 88 are uniquely identified in each analog portion 440 of an analog frame 430. The quality assessments signals are preferably transmitted as unmodulated subcarrier pilot signals, are preferably one voice increment in duration, and preferably have a separation of no more than 420 milliseconds within an analog portion of a frame. It will be appreciated that more than one message fragment could occur between two quality assessment signals, and that message fragments are typically of varying integral lengths of voice increments.

Figure 12:
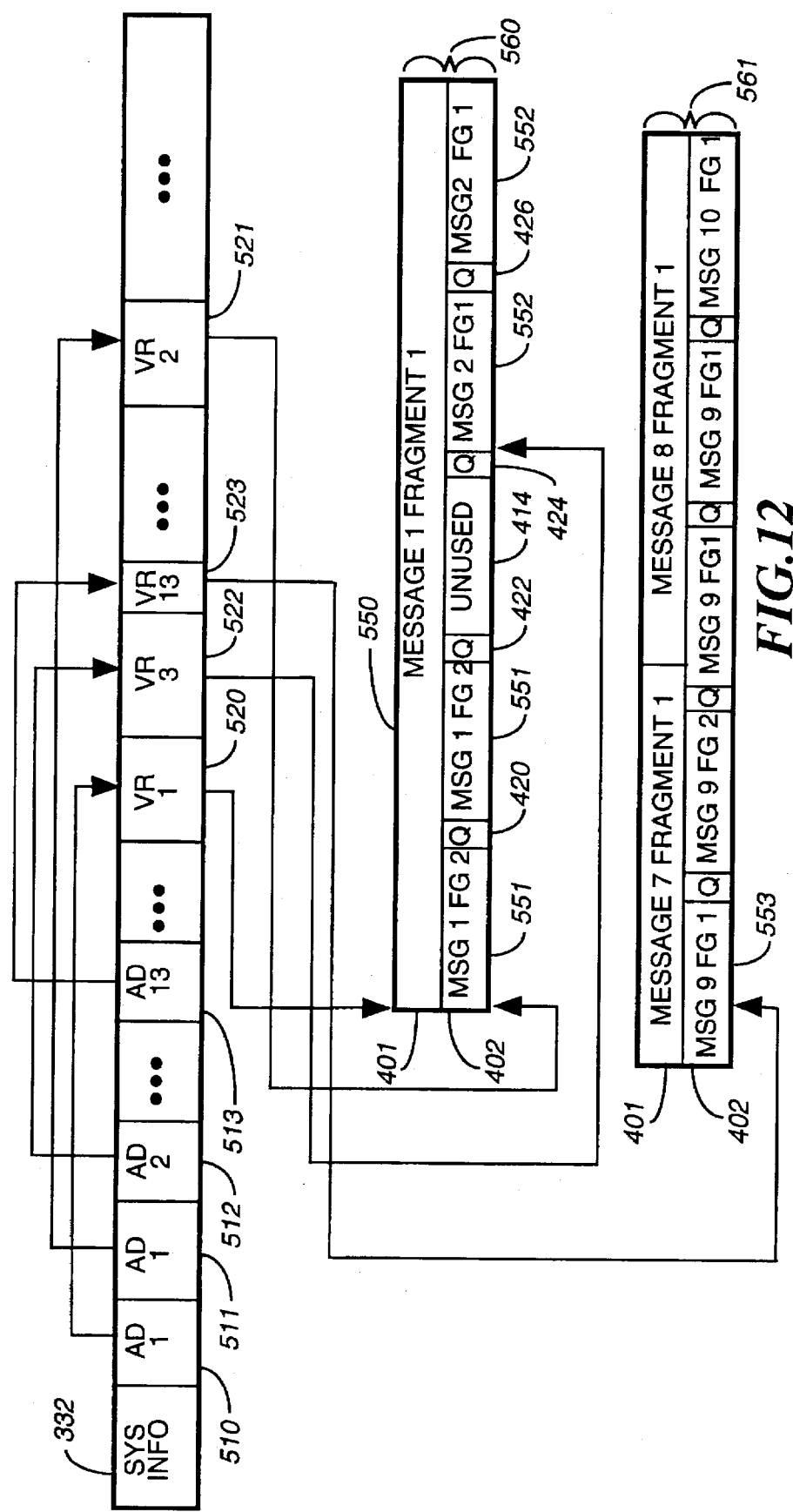
FIG. 12 is another timing diagram illustrating a control frame and two analog frames of the outbound signaling protocol in accordance with the present invention.

Referring to FIG. 12, a timing diagram illustrating a control frame 330 and two analog frames of the outbound signaling protocol utilized by the radio communication system of FIG. 1 is shown, in accordance with the preferred embodiment of the present invention. The diagram of FIG. 12 shows an example of a frame zero (FIG. 10) which is a control frame 330. Four addresses 510, 511, 512, 513 and four vectors 520, 521, 522, 523 are illustrated. Two addresses 510, 511 include one selective call radio 106 address, while the other two addresses 512, 513 are for a second and third selective call radio 106. Each address 510, 511, 512, 513 is uniquely associated with one of the vectors 520, 521, 522, and 523 by inclusion of a pointer within each address which indicates the protocol position of (i.e., where the vector starts and how long it is) the associated vector.

In the example shown in FIG. 12, vectors 520, 521, 522, 523 are also uniquely associated with a message portion in one of the subchannels. Specifically, vector 520 can point to an upper sideband of subchannel 441 (see FIG. 11) and vector 522 can point to a lower sideband of subchannel 441. Similarly, vector 521 can point to both sidebands of subchannel 442. That is, in the case of subchannel 441, the example can show that two different message portions are carried by the upper and lower sidebands. In the case of subchannel 442, two halves of one message portion are carried by the upper and lower sidebands respectively. Thus, the vectors preferably include information therein to indicate which subchannel (i.e., which radio frequency) the receiver should look for a message, and also information to indicate whether two separate messages are to be recovered from the subchannel, or whether first and second halves of a single message are to be recovered.

One use for the embodiment where two different messages are simultaneously transmitted over upper and lower sidebands (or I and Q channels), respectively, is where one message is a direct voice paging message, and the other is a voice mailbox message, which is to be stored in the pager.

In accordance with the preferred embodiment of the present invention the vector position is provided by identifying the number of words 350 after the vector boundary 335 at which the vector starts, and the length of the vector, in words. It will be appreciated that the relative positions of the addresses and vectors are independent for each other. The relationships are illustrated by the arrows. Each vector 520, 521, 522, 523 is uniquely associated with a message fragment 550, 551, 552, 553 by inclusion of a pointer within each vector which indicates the protocol position of (i.e., where the fragment starts and how long it is) the associated vector. In accordance with the preferred embodiment of the present invention the message fragment position is provided by identifying the frame 430 number (from 1 to 127), the subchannel 441, 442, 443 number (from one to three), the sideband 401, 402, (or I or Q) and the voice increment 450 where the message fragment starts, and the length of the message fragment, in terms of voice increments 450. For example, vector three 522 includes information which indicates that message two, fragment one 552, which is intended for selective call transceiver 106 having selective call address 512, is located starting at voice increment forty six 450 (the voice increments 450 are not identified in FIG. 12) of frame one 560, and vector thirteen 523 includes information which indicates that message nine fragment one 553, which is intended for selective call transceiver 106 having selective call address 513, is located starting at voice increment zero 450 (the voice increments 450 are not shown in FIG. 12) of frame five 561.

It will be appreciated that, while voice signals are described in accordance with the preferred embodiment of the present invention, other analog signals, such as modem signals or dual tone multifrequency (DTMF) signals, can alternatively be accommodated by the present invention. It should also be appreciated that the block information used in the frame structure previously described can be used to implement further enhancements that would allow for greater overall throughput in a communication system and allow for additional features. For instance, a message sent to a portable voice unit can request that an acknowledgment signal sent back to the system include information that would identify the transmitter it was receiving its messages from. Thus, frequency reuse in a simulcast system can be achieved in this way by transmitting messages to the given portable voice unit using the one transmitter required to reach the portable voice unit. Additionally, once the system knows the location of the portable voice unit, implementing target messaging logically follows.

In another aspect of the present invention, the time-scaling technique, previously described as WSOLA has some existing disadvantages when used in conjunction with the present invention. Thus, a technique was developed that modifies WSOLA to become speaker dependent and appropriately named "WSOLA-SD". To further understand our modification of WSOLA to form WSOLA-SD, a brief description of WSOLA follows.

A technique called Waveform similarity based Overlap-Add technique (WSOLA) can achieve high-quality time-scale modification compared to other techniques and is also much simpler than other methods. When used to speed up or slow down speech, the quality of speech is not very good even with the WSOLA technique. The reconstructed speech contains a lot of artifacts like echoes, metallic sounds and reverberations in the background. This aspect of the present invention describes several enhancements to overcome this problem and minimize the artifacts present. Many parameters in the WSOLA algorithm have to be optimized to achieve the best quality possible for a given speaker and required compression/expansion or time-scaling factor. This aspect of the invention deals with determining those parameters and how to incorporate them in compression/expansion or time-scaling of speech signals with improvement in the quality of the recovered speech or voice signal.

The WSOLA Algorithm: Let x(n) be the input speech signal to be modified, y(n) the time-scale modified signal and $\alpha$ be the time-scaling parameter. If $\alpha$ is less than 1 then the speech signal is expanded in time. If $\alpha$ is greater than 1 then the speech signal is compressed in time.

Figure 13:
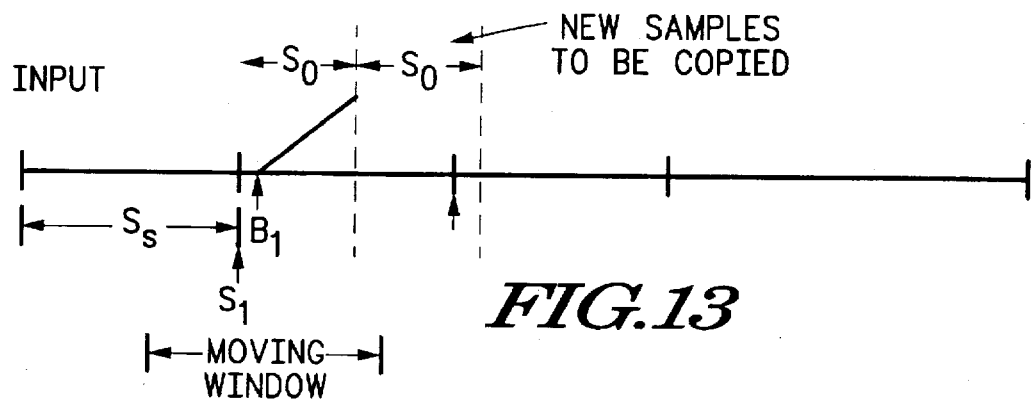
FIGS. 13–17 illustrate timing diagrams for several iterations of the WSOLA time-scaling (compression) method in accordance with the present invention.
Figure 14:
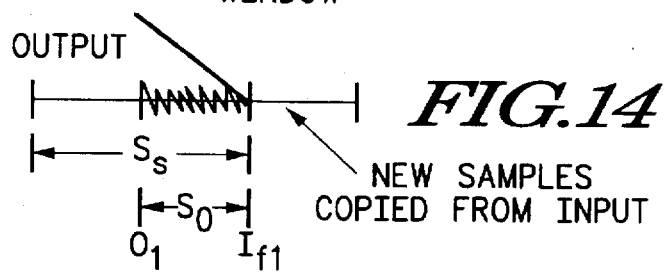

Referring to FIGS. 13–17, timing diagrams for several iterations of the WSOLA time-scaling (compression) method is shown for comparison to the preferred method of WSOLA-SD of the present invention. Assuming that the input speech signals are appropriately digitized and stored, FIG. 13 illustrates the first iteration of the WSOLA method on an uncompressed speech input signal. The WSOLA method requires a time scale factor of $\alpha$ (which we assume is equal to 2 for this example, where if $\alpha>1$ we have compression and if $\alpha<1$ we have expansion) and an arbitrary analysis segment size (Ss) which is independent of the input speech characteristics, and in particular, independent of pitch. An overlap segment size So is computed as 0.5*Ss and is fixed in WSOLA. The first Ss samples are copied directly to the output as shown in FIG. 14. Let the index of the last sample in the output be $I_{f1}$. An overlap index $O_1$ is determined as Ss/2 samples from the end of the last available sample in the output. Now the samples which would be overlap added are between $O_1$ and $I_{f1}$. Search index ($S_1$) is determined as $\alpha*O_1$. After an initial portion of the input signal is copied into the output, a determination is made of the moving window of samples from the input. The window is determined around the search index $S_1$. Let the beginning of the window be $S_i-L_{offset}$ and the end be $S_i+H_{offset}$. In the first iteration, i=1. Within the window, the best correlating So samples are determined using a Normalized Cross-Correlation equation given by:

$$R(k) = \frac{\sum_{j=0}^{j=S_0} x(S_i+k+j)y(O_i+j)}{\left[\sum_{j=0}^{j=S_0} x^2(S_i+k+j) \sum_{j=0}^{j=S_0} y^2(O_i+j)\right]^{1/2}}$$

where $$k = S_i - L_{offset}, S_i + H_{offset}$$

The lag k=m for which the normalized R(k) is maximum is determined. The best index Bi is given by Si+m. Note that other schemes like Average Magnitude Difference Function (AMDF) and other correlation functions can be used to find the best matching waveform. The So samples beginning at B1 are then multiplied by an increasing ramp function (although other weighting functions could be used) and added to the last So samples in the output. Prior to the addition, the So samples in the output are multiplied by a decreasing ramp function (although other weighting functions could be used here as well). The resulting samples of the addition will replace the last So samples in the input. Finally, the next So samples which immediately follow the prior best matching So samples are then copied to the end of the output for use in the next iteration. This would be the end of the first iteration in WSOLA.

Figure 15:
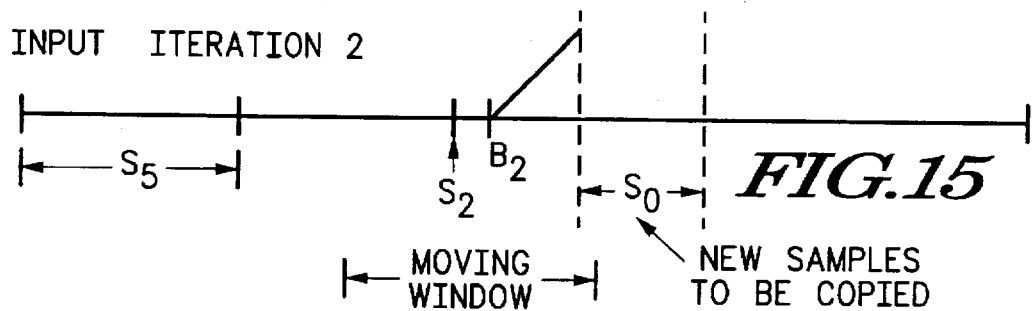
Figure 16:
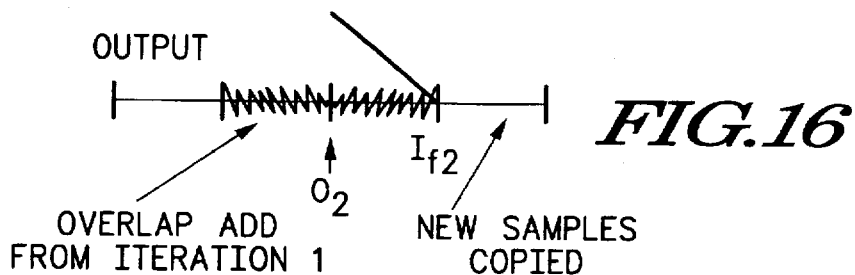

Referring to FIGS. 15 and 16 for the next iteration, we need to compute a new overlap index $O_2$, similarly to $O_1$. Likewise, a new search index $S_2$ and corresponding search window is determined as was done in the previous iteration. Once again, within the search window, the best correlating So samples are determined using the cross-correlation equation previously described above, where the beginning of the best samples determined is $B_2$. The So samples beginning at B2 are then multiplied by an increasing ramp function and added to the last So samples in the output. Prior to the addition, the So samples in the output are multiplied by a decreasing ramp function. The resulting samples of the addition will replace the last So samples in the input. Finally, the next So samples which immediately follow the prior best matching So samples are then copied to the end of the output for use in the next iteration, where future $i^{th}$ iterations would have an overlap index $O_i$, a Search index $S_i$, last sample in output $I_{fi}$, and a best index $B_i$.

Figure 17:
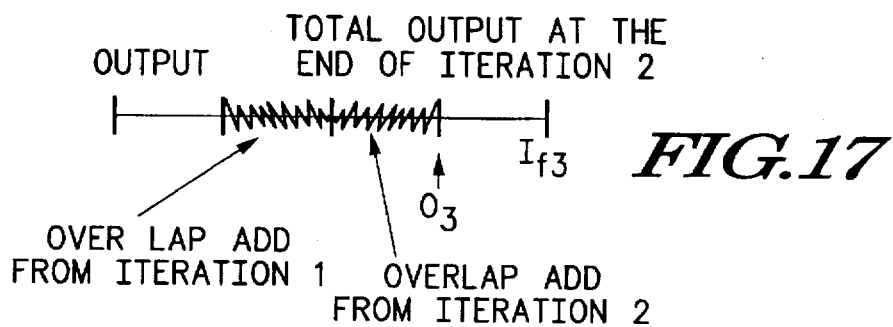

FIG. 17 shows the resultant output from the previous two iterations described with reference to FIGS. 13–16. Once should note that there is no overlap in the resultant output signal between the two iterations. If the method were to continue in a similar fashion, the WSOLA method would time scale (compress) the entire speech signal, but there would never be any overlap between the results of each of the iterations. WSOLA time-scale expansion is done in a similar fashion.

Several drawbacks or disadvantages of WSOLA with respect to the preferred method of the present invention (WSOLA-SD) become apparent. These drawbacks should be kept in mind as you follow the next examples of the WSOLA-SD method shown in FIGS. 18-23. A primary drawback of WSOLA includes the inability to obtain the optimum quality of time scaled speech because a fixed analysis segment size (Ss) is used for all input speech irrespective of the pitch characteristics. For instance, if the Ss was too large for the input speech signal, the resultant speech upon expansion would include echoes and reverberations. Further, if the Ss is too small for the input speech signal, then the resultant speech upon expansion would sound raspy.

A second significant drawback of WSOLA results when compression rates ($\alpha$) are greater than 2. In such instances, the separation of the moving window between iterations may cause the method to skip significant input speech components, thereby seriously affecting the intelligibility of the resultant output speech. Increasing the size of the moving windows to compensate for the non-overlapping search windows during iterations causes further skipping of some input speech as a result of the cross-correlation function and further causes variable time-scaling that noticeably affects the resultant output speech.

A third drawback of the WSOLA method involves its failure to provide a designer or user the flexibility (for a given time-scaling factor ($\alpha$)) with respect to quality of speech and complexity of computation for a given system having given restraints. This is particularly apparent because the degree of overlap (f) is fixed at 0.5 in the WSOLA method. Thus, in an application that requires high quality speech reproduction, assuming adequate processing power and memory, the WSOLA-SD method of the present invention can use a higher degree of overlap at the expense of added computational complexity to provide higher quality speech reproduction. On the other hand, in an application that is limited by processing power, memory or other constraints, the degree of overlap can be lowered in WSOLA-SD so that the quality of speech is sacrificed only to the extent desired, taking into account the particular application constraints at hand.

Figure 25:
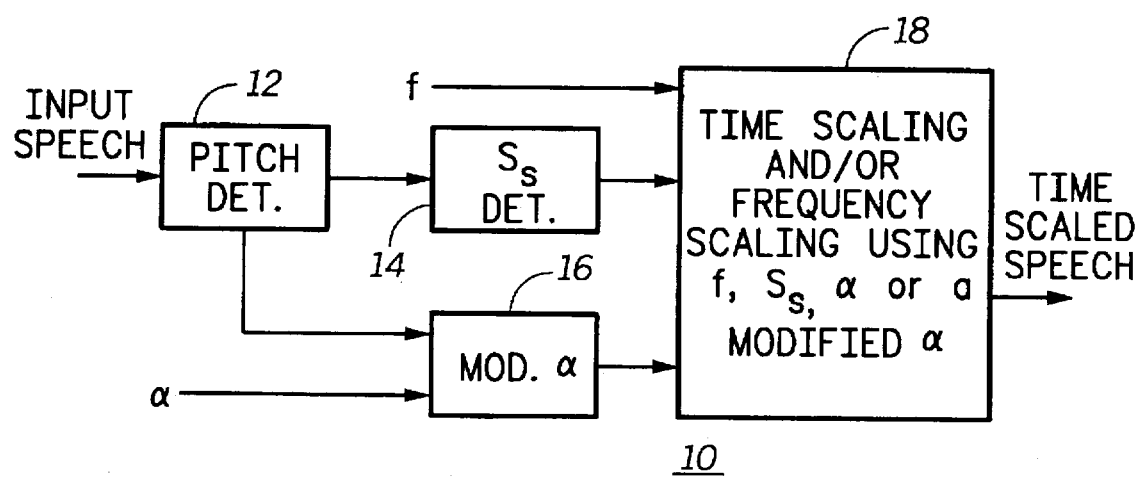
FIG. 25 illustrates a block diagram of the overall WSOLA-SD time scaling method in accordance with the present invention.

FIG. 25 illustrates an overall block diagram of WSOLA-SD method. In this block diagram Ss, f and $\alpha$ are computed depending on whether we are compressing or expanding speech. This WSOLA-SD algorithm provides great improvement in the quality of reconstructed speech over WSOLA alone. The WSOLA-SD method is speaker dependent, particularly to the pitch of a particular speaker. Thus, a pitch determination 12 is done before an analysis segment sized is determined (14). For a given f and $\alpha$ (which can be modified dependent upon the pitch determination 12, providing a modified alpha (16)), WSOLA-SD time scales (18) the speech. The time-scaling can either be expansion or compression of the input signal. Alternatively, frequency-scaled signal can be obtained by interpolating the time-scaled signal by a factor of $\alpha$ if $\alpha>1$ or by decimating the time-scaled signal by a factor of $1/\alpha$ if $\alpha<1$. Interpolation and decimation are well known techniques in digital signal processing as described in Discrete Time Signal Processing by Oppenheim & Schaefer. For example, assuming 2 seconds worth of an input speech is sampled at 8 kHz, where the signal has significant frequency components between 0 and 4000 Hz. Assuming the input speech signal is time-scale compressed by a factor of 2. The resultant signal would have a length of 1 second, but would still have significant frequency components between 0 and 4000 Hertz. The signal is interpolated (See Oppenheim & Schaefer) by a factor of $\alpha=2$. This would result in a signal which is 2 seconds long, but with frequency component between 0 and 2000 Hertz. Returning to the time scale domain can be achieved by decimating the frequency compressed signal by a factor of $\alpha=2$ to obtain the original time scaled speech (frequency components between 0-4000 Hertz) without any loss of information content.

Figure 18:
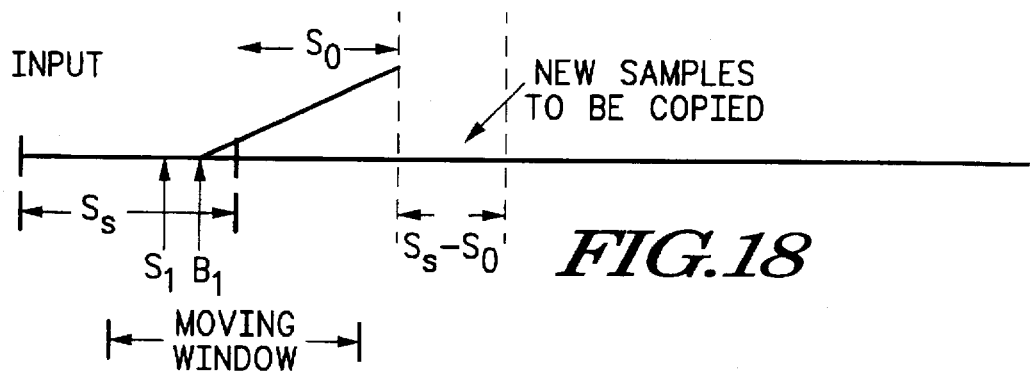
FIGS. 18–22 illustrate timing diagrams for several iterations of the WSOLA-SD time-scaling (compression) method in accordance with the present invention.

Referring to FIGS. 18-22, timing diagrams for several iterations of the WSOLA-SD time-scaling (compression) method is shown in accordance with the present invention. Assuming that the input speech signals are appropriately digitized and stored, FIG. 18 illustrates the first iteration of the WSOLA-SD method on an uncompressed speech input signal. The WSOLA-SD method also requires the determination of an approximate pitch period of the voiced portions of the input speech signal. A brief description of the pitch determination and how the segment size is obtained from it is given below.

1) Frame input speech into 20 ms blocks.
2) Compute energy in each block.
3) Compute average energy per block.
4) Determine energy threshold to detect voiced speech as a function of the average energy per block.
5) Using the energy threshold determine contiguous blocks of voiced speech of a length of at least 5 blocks.
6) On each block of the contiguous voice speech found in step 5, do a pitch analysis. This could be done using a variety of methods including Modified Auto correlation method, AMDF or Clipped auto correlation method.
7) The pitch values are smoothened using a median filter to eliminate errors in the estimation.
8) Average all the smoothened pitch values to obtain an approximate estimate of the speaker's pitch
9) Thus, the Segment size Ss computation is given below.

If pitch P greater than 60 samples Ss=2*Pitch
If pitch P is between 40 and 60 samples Ss=120
If P less than 40 samples Ss=100

A sampling rate of 8 Khz is assumed in all cases above. A critical factor that provides WSOLA-SD with the advantages that overcomes some of the drawbacks previously described above in the description of WSOLA is the degree of overlap f. If the degree of overlap f in WSOLA-SD is greater than 0.5, then this provides higher quality at the expense of more complexity. If the degree of overlap f in WSOLA-SD is less than 0.5, then this reduces complexity of the algorithm at the expense of quality. Thus, the user has more flexibility and control in design and use of their particular application.

Figure 19:
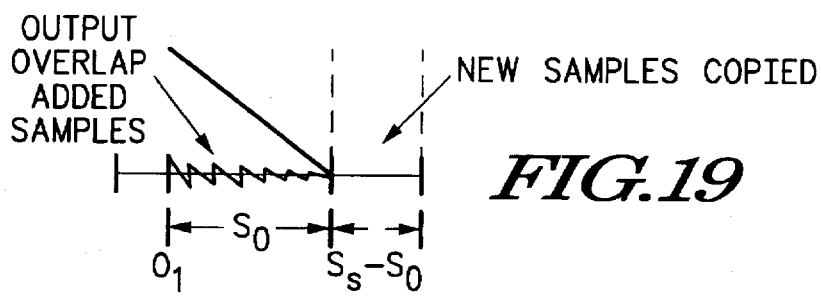

Again, referring to FIGS. 18-23, the WSOLA-SD method requires a time scale factor of $\alpha$ (which we assume is equal to 2 for this example, where if $\alpha>1$ we have compression and if $\alpha<1$ we have expansion) and an analysis segment size (Ss) which is optimized to the input speech characteristics, namely the pitch of the speaker. An overlap segment size So is computed as f*Ss and is fixed in WSOLA-SD for a given pitch period and f. In the example shown, f is greater than 0.5, to show higher quality resultant output speech. The first Ss samples are copied directly to the output. Let the index of the last sample be $I_n$. An overlap index $O_1$ is determined as So samples from the end of the last available sample in the output. Now the samples which would be overlap added are between $O_1$ and $I_n$ as shown in FIG. 19. The first search index ($S_1$) is determined as $\alpha*O_1$ as seen in FIG. 18. After an initial portion of the input signal is copied into the output, a determination is made as to the location of the moving window of samples from the input speech signal. The window is determined around or about the search index $S_1$. Within the window, the best correlating So samples are determined using the cross-correlation equation previously described above, where the beginning of the best samples determined is $B_1$. The So samples beginning at B1 are then multiplied by an increasing ramp function (although other weighting functions could be used) and added to the last So samples in the output. Prior to the addition, the So samples in the output are multiplied by a decreasing ramp function. The resulting samples of the addition will replace the last So samples in the input. Finally, the next Ss-So samples which immediately follow the prior best matching So samples are then copied to the end of the output for use in the next iteration. This would be the end of the first iteration in WSOLA-SD.

Figure 20:
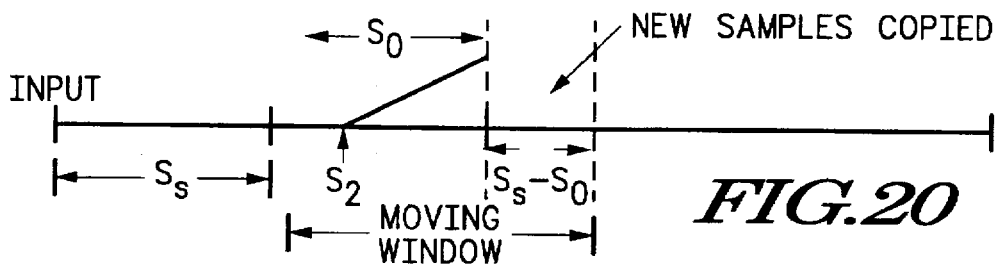
Figure 21:
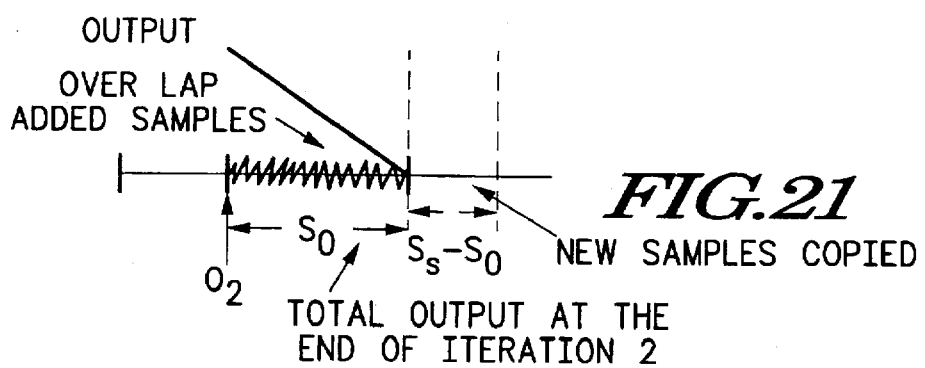

Referring to FIGS. 20 and 21 for the next iteration, we need to compute a new overlap index $O_2$, similarly to $O_1$. Likewise, a new search index $S_2$ and corresponding search window is determined as done in the previous iteration. Once again, within the search window, the best correlating So samples are determined using the cross-correlation equation previously described above, where the beginning of the best samples determined is $B_2$. The So samples beginning at B2 are then multiplied by an increasing ramp function and added to the last So samples in the output. Prior to the addition, the So samples in the output are multiplied by a decreasing ramp function. The resulting samples of the addition will replace the last So samples in the input. Finally, the next Ss-So samples which immediately follow the prior best matching So samples are then copied to the end of the output for use in the next iteration.

Figure 22:
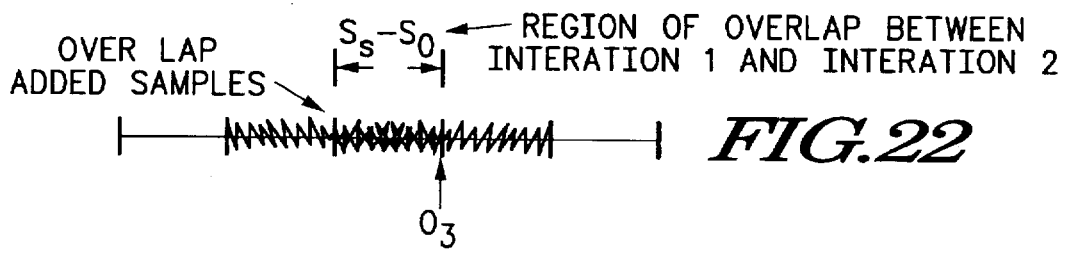

FIG. 22 shows a resultant output signal from two iterations using the WSOLA-SD method. Note that there is a region of overlap (Ss-So) in the resultant output signal which insures increased intelligibility and prevents the method from skipping critical input speech components as compared to the WSOLA method.

Figure 23:
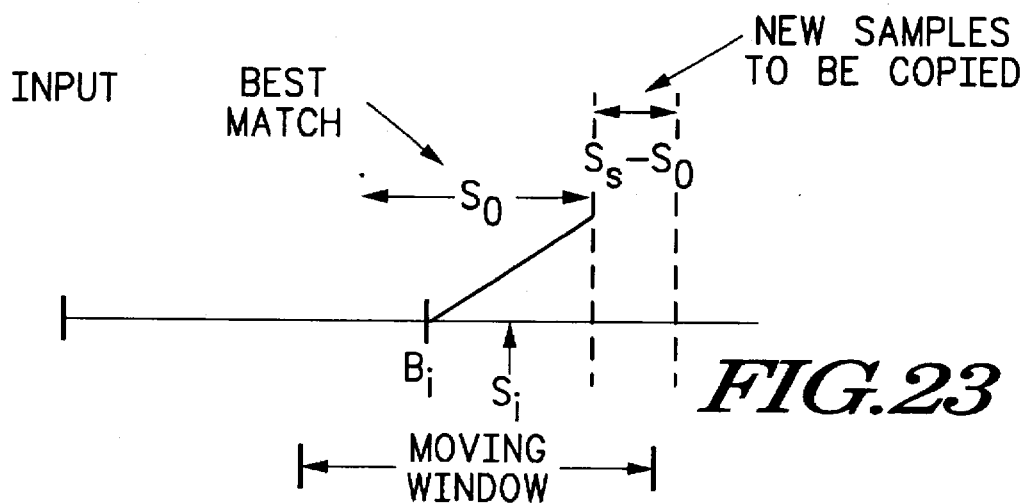
FIGS. 23–24 illustrate timing diagrams for iterations of the WSOLA-SD time-scaling (expansion) method in accordance with the present invention.
Figure 24:
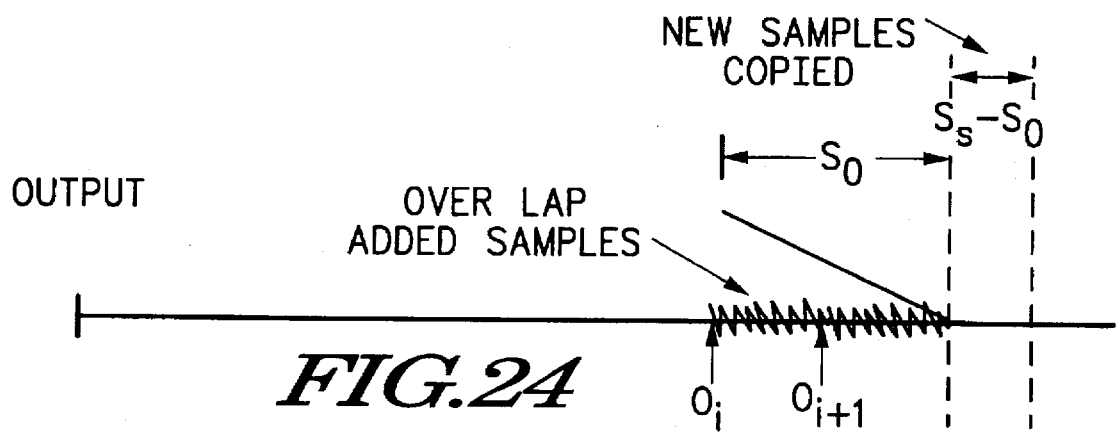

Referring to FIGS. 23 and 24, an $i^{th}$ iteration of an example input timing diagram and output timing diagram for time-scale expansion using the WSOLA-SD method is shown in accordance with the present invention. The method for expansion essentially functions similarly to the examples shown in FIGS. 18–22 except that $O_i$, the overlap index, moves faster than the $S_i$, the Search index. To be exact, $O_i$ moves $\alpha$ times faster than $S_i$ during expansion. The analysis segment size Ss is dependent on the pitch period of the input speech. The degree of overlap can range from 0 to 1, but 0.7 is used for this example in FIGS. 23 and 24. The time scaling factor $\alpha$, in this instance, will be the inverse of the expansion rate. Assuming the expansion rate was 2, then the time scaling factor $\alpha=0.5$. The overlap segment size So would equal f*Ss or the degree of overlap times the analysis segment size. Thus, after several iterations of overlap adding and using an increasing ramp function on each best matching input segment and using a decreasing ramp function on each output overlap segment, prior to the addition, the input speech signal is expanded as the output speech signal that maintains all the advantages of WSOLA-SD as previously described.

Further improvement is obtained by dynamically adapting the segment size Ss in the WSOLA-SD algorithm with the pitch of the segment at that instant. This is done by a modification of the scheme explained previously. If we use a short segment size of Ss=100(sampling rate 8 Khz is assumed) for unvoiced speech sounds their quality is improved and for voiced speech the segment size will be Ss=2*Pitch. Also a few changes are necessary to determine whether the speech segment is voiced or unvoiced. The method with these changes is described below.

1) Frame input speech into 20 ms blocks.
2) Compute energy in each block.
3) Compute number of zero-crossings in each block.
4) Compute average energy per block.
5) Determine energy threshold to detect voiced speech as a function of the average energy per block.
5) Using the energy threshold and zero-crossing threshold determine, contiguous blocks of voiced speech of length of at least 5 blocks.
6) Do pitch analysis on all the voiced segments and determine the average pitch in each of those voiced segments. This could be done using a variety of methods including Modified Auto correlation method, AMDF or Clipped auto correlation method.
7) The segments that are not marked as Voiced speech are now marked as tentative unvoiced segments.
8) Contiguous blocks of at least 5 frames in the 'tentative unvoiced segments' are taken and pitch analysis is done. The ratio of the maximum to minimum correlation coefficient is determined. If the ratio is large then the segment is classified as Unvoiced or if it is small these segments are marked as voiced and average pitch of those segments are determined along with the start and ending of the speech segment.
9) Segment size Ss for each of these classified speech segments are determined as follows.

If Voiced Ss=2*Pitch

If Unvoiced Ss=100 (Sampling rate of 8 Khz is assumed)
10) Now WSOLA-SD method of time-scaling is done, but with a varying segment size. Here the position of the input speech segment used in the processing at each time instant is determined. Depending on its position, the segment sizes Ss already determined is used in the processing. Using this technique results in a higher quality time-scaled speech signal.

If WSOLA-SD is used to do both compression and then a subsequent expansion on the same speech input signal as in the case of our communication system, the quality of the reconstructed speech signal can be further improved for a given average time-scale factors using several techniques.

From perceptual tests, it can be seen that a speech signal which has a higher fundamental frequency (lower pitch period) can be compressed more for a given speech quality as compared to a speech signal which has a lower fundamental frequency (higher pitch period). For instance, children and female speakers will on average have a higher fundamental frequency. Thus, their speech can be compressed/expanded by 10% more without noticeably affecting the quality of their speech. Whereas male speakers who have speech on average with a lower fundamental frequency, can have their speech compressed/expanded by 10% less. Thus, in a typical communication system having roughly equal number of speakers having higher and lower fundamental frequencies, an overall improved quality in the reproduction of speech is obtained with the same compression/expansion (time-scaling) factor as before.

Another characteristic of expansion and compression using this technique leads to further enhancements. For instance, it was noticed that most of the artifacts in the speech are produced during the time-scale expansion of the speech signal. The more the speech signal is expanded the more the artifacts. It was also observed that if the speech signal is played back a little faster (less than 10%) than the original speech, the change in speed is hardly noticeable, but with a noticeable reduction in artifacts. This property helps expand the speech signal with a smaller expansion factor and thus reduce the artifacts and improve its quality. For example, if the input speech is compressed by a time-scaling factor of 3, then during expansion it would be expanded by a factor of 2.7, which means that the speech will be played faster by 10%. Since this change in speech rate will not be noticeable and reduces artifacts, it should be implemented in the method of the present invention in applications where the accuracy of the speech is not absolutely critical.

What is claimed is:

1. A method for compressing a plurality of voice signals within a voice communication resource having a given bandwidth within a voice communication system, comprising the steps of:
    (a) subchanneling the voice communication resource into a plurality of subchannels and simultaneously placing a pair of the plurality of voice signals on a subchannel;
    (b) modulating the pair of the plurality of voice signals about a pilot signal within the subchannel within the voice communication resource using single sideband modulation; and
    (c) compressing the time of each of the voice signals within the plurality of subchannels, wherein the result of steps (a), (b), and (c) provides a compressed voice signal.

2. The method of claim 1, wherein the step of subchanneling further comprises the step of using quadrature amplitude modulation.

3. The method of claim 1, wherein the step of compressing the time of each of the voice signals further comprises the step using time-scale compression on the voice signals.

4. The method of claim 1, wherein the step of compressing the time of each of the voice signals further comprises the step of using Waveform Similarity based Overlap-Add (WSOLA) time compression on the voice signals.

5. The method of claim 1, wherein the step of compressing the time of each of the voice signals further comprises the speaker dependent steps of identifying pitch periods within each of the voice signals and transmitting data from one pitch period to alter a time-scaling factor.

6. The method of claim 1, wherein the step of compressing the time of each of the voice signals comprises the step of using a speaker dependent modification of the Waveform Similarity based Overlap-Add (WSOLA) time compression technique on the voice signals.

7. A method for compressing a plurality of voice signals within a voice communication resource within a voice communication system, comprising the steps of:
    (a) subchanneling the voice communication resource into a plurality of subchannels and simultaneously placing a pair of the plurality of voice signals on a subchannel;
    (b) modulating the pair of the plurality of voice signals about a pilot signal within the subchannel within the voice communication resource using single sideband modulation; and
    (c) compressing the time of each of the voice signals within the plurality of subchannels, wherein the result of steps (a), (b), and (c) provides a compressed voice signal for transmission via a transmitter.

8. The method of claim 7, wherein the method further comprises the step at the transmitter of transmitting the compressed voice signal to a plurality of selective call receivers.

9. The method of claim 7, wherein the method further comprises the step of receiving the compressed voice signal and demodulating the compressed bandwidth signals at one of the the plurality of selective call receivers.

10. A communication system using voice compression having at least one transmitter base station and a plurality of selective call receivers, comprising:
    at the transmitter base station:
    an input device for receiving an audio signal;
    a processing device for compressing the audio signal using time-scale compression and a single side band modulation technique to provide a processed signal; and
    a pilot carrier signal generator that generates a pilot carrier for a pair of single side band signals which includes the processed signal, wherein the pilot carrier serves as an amplitude and phase reference for distortion that occurs as a result of channel aberrations; and
    a transmitter for transmitting the processed signal;
    at each of the plurality of selective call receivers:
    a selective call receiver for receiving the transmitted processed signal;
    a receiver circuit for detecting, filtering and responding to the amplitude and phase reference generated by the pilot carrier signal generator;
    a processing device for demodulating the received processed signal using single side band demodulation and time-scale expansion to provide a reconstructed signal; and
    an amplifier for amplifying the reconstructed signal into an reconstructed audio signal.

11. The communication system of claim 10, wherein the single sideband modulation technique provides for the transmission of a single message split between an upper sideband and a lower sideband.

12. The communication system of claim 10, wherein the single sideband modulation technique provides for the transmission of a single message repeated on an upper sideband and lower sideband.

13. A selective call receiver for receiving compressed voice signals, comprising:
    a selective call receiver for receiving a transmitted processed signal that includes compressed voice signals that have been compressed using time-scale compression;
    a processing device for demodulating the received processed signal, wherein said processing device demodulates both and upper and a lower sideband of a subchannel, the upper and lower sidebands having independent information therein, and wherein said processing device uses time-scale expansion to provide a reconstructed signal;
    a receiver circuit for detecting, filtering and responding to the amplitude and phase reference generated by a pilot carrier signal generator in a transmitter at a base station; and
    an amplifier for amplifying the reconstructed signal into an reconstructed audio signal.

14. A selective call paging base station for transmitting selective call signals on a communication resource having a predetermined bandwidth, comprising:

an input device for receiving a plurality of audio signals;

a means for subchannelizing the communication resource into a predetermined number of subchannels;

an amplitude compression and filtering module for each subchannel for compressing the amplitude of the respective audio signal and filtering the respective audio signal;

a time compression module for compressing the time of the respective audio signal for each subchannel; and a quadrature amplitude modulation transmitter for transmitting the processed signal.

15. The selective call paging base station of claim 14, wherein the input device for receiving a plurality of audio signals, comprises a paging terminal for receiving phone messages or data messages from a computing device.

16. The selective call paging base station of claim 14, wherein the amplitude compression and filtering module comprises an anti-alias filter coupled to an analog-to-digital converter coupled to a band-pass filter coupled to an automatic gain controller and clipper circuit.

17. The selective call paging base station of claim 14, wherein the time compression module comprises a processing device for compressing the audio signal using a time-scale compression technique.

18. The selective call paging base station of claim 14, wherein the time compression module comprises a processing device for compressing the audio signal using a WSOLA time compression technique.

19. A selective call receiver unit for receiving compressed voice selective call signals, comprising:

a receiver having a analog to digital converter for providing a digitized received signal;

a digital signal processor for performing single sideband demodulation of a subchannel having a pilot carrier and independent information on an upper and a lower sideband of a subchannel, wherein the digital signal processor also performs the functions of filtering the pilot carrier, performing automatic gain control using a feedforward loop, and decompanding the digitized received signal to provide a processed signal; and a digital to analog converter and reconstruction filter for converting the processed signal into a digitized audio signal; and an amplifier for amplifying the digitized audio signal.

20. A communication base station, comprising:

a terminal for receiving an audio speech signal;

an analog to digital converter for converting the audio speech signal into a digitized speech signal;

a digital signal processor for processing the digitized speech signal by performing the function of splitting the digitized speech signal and at least one of the functions of bandpass filtering, automatic gain control, time scaling, companding, or buffering; and a transmitter having at least a Hilbert transform filter coupled to a digital to analog converter coupled to a reconstruction filter coupled to a quadrature, amplitude modulator which is coupled to a radio frequency power amplifier.

\* \* \* \* \*